US008369454B2

(12) United States Patent
Tachi

(10) Patent No.: US 8,369,454 B2
(45) Date of Patent: Feb. 5, 2013

(54) DATA RECEIVING APPARATUS AND DATA RECEIVING METHOD

(75) Inventor: Nobuyuki Tachi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 736 days.

(21) Appl. No.: 12/457,519

(22) Filed: Jun. 12, 2009

(65) Prior Publication Data

US 2009/0323877 A1    Dec. 31, 2009

(30) Foreign Application Priority Data

Jun. 17, 2008    (JP) .................................. 2008-158461

(51) Int. Cl.
*H04L 25/06* (2006.01)

(52) U.S. Cl. ......................................................... 375/316

(58) Field of Classification Search .................. 375/238, 375/279, 293, 316, 364; 370/509; 709/224
See application file for complete search history.

(56) References Cited

U.S. PATENT DOCUMENTS

| 4,327,441 A * | 4/1982 | Bradshaw ..................... 375/364 |
| 5,867,533 A * | 2/1999 | Fleek et al. ................... 375/279 |
| 6,704,350 B1 | 3/2004 | Ryu et al. |
| 7,106,793 B2 * | 9/2006 | Spichale ....................... 375/238 |
| 7,757,021 B2 * | 7/2010 | Wenzel ........................... 710/60 |
| 8,055,754 B2 * | 11/2011 | Scheering ..................... 709/224 |
| 2002/0101884 A1 * | 8/2002 | Pohlmeyer et al. ............ 370/509 |
| 2006/0013348 A1 * | 1/2006 | Klosters et al. ............... 375/368 |
| 2006/0245515 A1 * | 11/2006 | Tachi ............................. 375/293 |

FOREIGN PATENT DOCUMENTS

| DE | 10 2006 018 574 (A1) | 11/2006 |
| JP | 2000-209302 A | 7/2000 |
| JP | 2002-280973 | 9/2002 |
| JP | 2004-228945 A | 8/2004 |
| JP | 2006-311237 A | 11/2006 |

OTHER PUBLICATIONS

German Office Action dated Jul. 14, 2010, with English translation.

* cited by examiner

*Primary Examiner* — David Ometz
*Assistant Examiner* — Fitwi Hailegiorgis
(74) *Attorney, Agent, or Firm* — McGinn IP Law Group, PLLC

(57) ABSTRACT

A data receiving apparatus includes a measuring section configured to measure a first pulse width of a first pulse, a second pulse width of a second pulse, and a third pulse width of a third pulse. The first pulse, the second pulse, and the third pulse are sequentially and continuously received by putting a portion of a second signal level different from the first signal level between the first and second pulse and the second and third pulse. A first comparing section performs a first determination based on a measured value of the first pulse width and a measured value of the second pulse width, and a second comparing section configured to perform a second determination based on the measured value of the second pulse width and the measured value of the third pulse width, based on the first determination and the second determination.

17 Claims, 15 Drawing Sheets

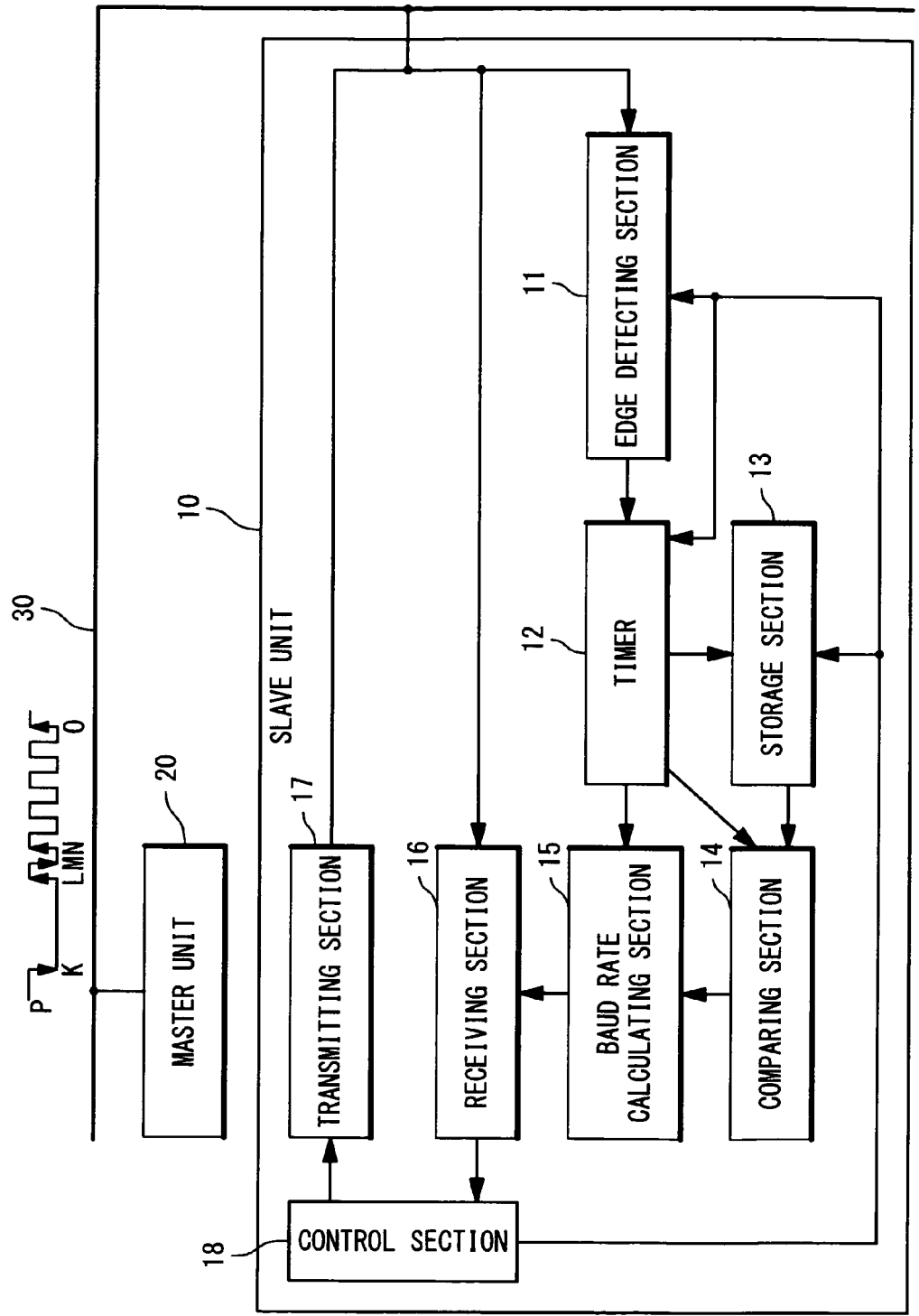

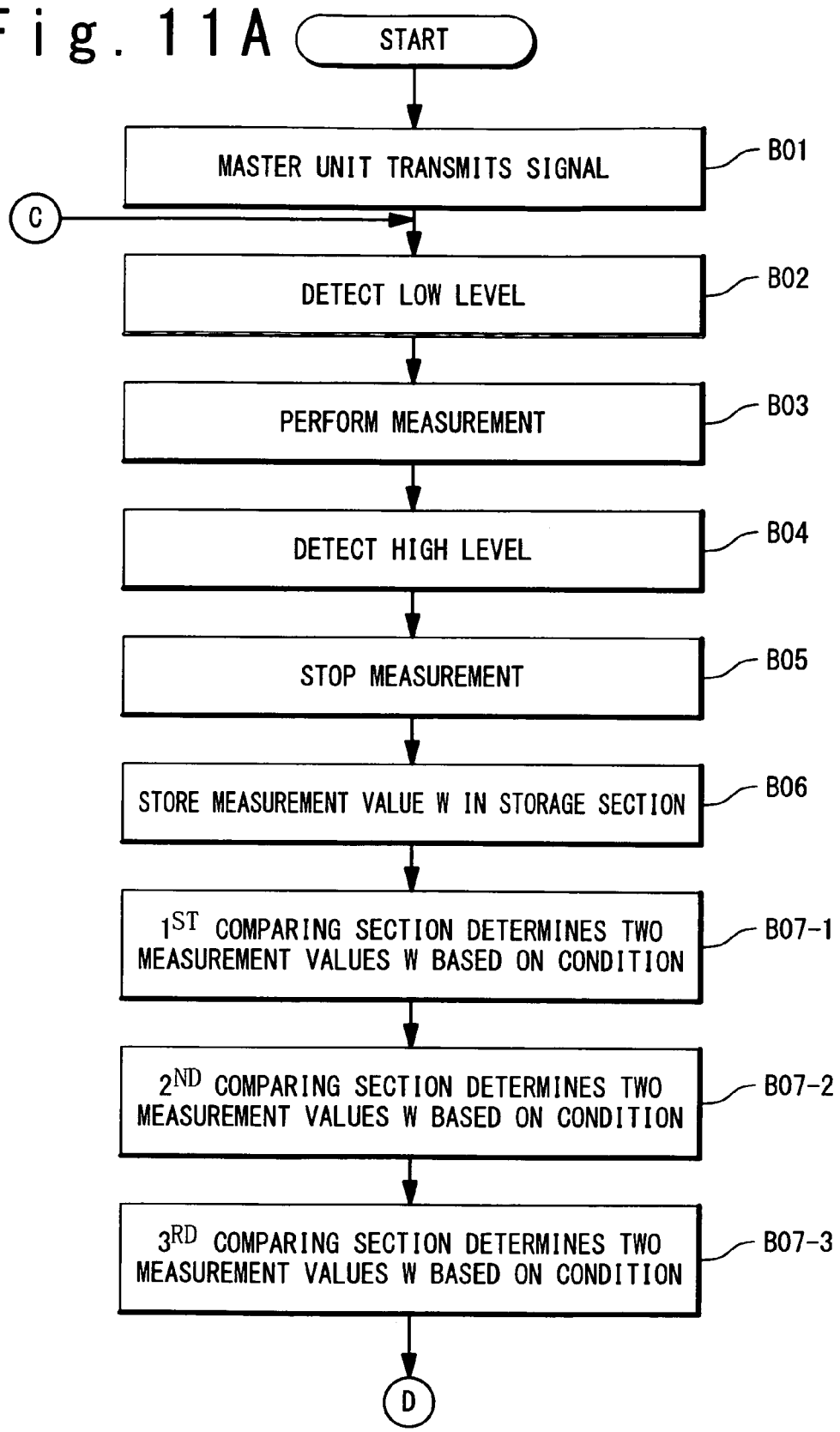

DATA RECEIVING APPARATUS AND DATA RECEIVING METHOD

INCORPORATION BY REFERENCE

This patent application claims priority on convention based on Japanese Patent Application No. (2008-158461). The disclosure thereof is incorporated herein by reference.

BACKGROUND OF THE INVENTION

1. Field of the Invention

The present invention relates to a data receiving apparatus and a data receiving method, and particularly, relates to transmission/reception of a synchronization signal.

2. Description of Related Art

In recent years, needs for a LAN (Local Area Network) mounted on a vehicle increase and a communication protocol optimized for each application is used for LAN mounted on vehicle. LIN (Local Interconnect Network) is a kind of communication protocol for a LAN mounted on vehicle, is a serial communication protocol used in a master/slave configuration, and is used in a simple system mainly having a body system. LIN communication protocol includes Synch Break representing the start of a frame, followed by a field of a synchronization signal called Synch Field. The Synch Field in communication data transmitted from a master side is received on a slave side, and Ident Field and Data Field or other fields flowing subsequent to Synch Filed is received based on a baud rate of Synch Field, as described in Japanese Patent Application Publication (JP-P2004-228945A).

A communication method between a user terminal and a circuit apparatus has been known as a method in which start-stop synchronous serial data is used. In this communication method, specific codes (i.e. 41h and 61h in hexadecimal notation) called an AT commands are initially transmitted. Both of these specific codes use 1 for the least significant bit (LSB), and a space for one bit (i.e. start bit) always appears at the start of communication according to a bit string of LSB first in a serial interface. Time for this space is measured to obtain a communication speed (Japanese Patent Application Publication JP-P2000-209302A).

Japanese Patent Application Publication (JP-P2006-311237A) discloses a technique related to a data receiving apparatus for appropriately detecting Synch Field in the LIN communication protocol. FIG. 1 is a block diagram showing a configuration example of a communication system in this related art, partially showing a binary signal P in the LIN communication protocol. Referring to FIG. 1, the communication system has a slave unit 10 and a master unit 20, which are connected via a bus 30. The master unit 20 transmits the binary signal P on the bus 30. The slave unit 10 receives this binary signal P, and then a predetermined binary signal P is transmitted/received between the slave unit 10 and the master unit 20, as needed.

Referring to a binary signal P in the LIN communication protocol in FIG. 1, Synch Break is a pulse in which a low level of 11 bits or more is continued (between K and L). Synch Field is a synchronization signal of "01010101" (0 and 1 represent a low level and a high level, respectively) from a high level following Synch Break in the low level. Meanwhile, a signal initially received by the slave unit 10 which measures a baud rate based on Synch Field is not limited to Synch Break. It is because the master unit 20 for transmitting the signal is not ensured to operate in synchronization with the slave unit 10 at the time of starting. Accordingly, even if the slave unit 10 focuses attention on a second pulse while acquiring a baud rate by measuring a first pulse width, as described in Japanese Patent Application Publication (JP-P2000-209302A), the second pulse is not ensured to be a start bit of Synch Field. That is, even if a baud rate is acquired from the second pulse to receive subsequent data, data is not appropriately received. Accordingly, Japanese Patent Application Publication (JP-P2006-311237A) proposes the slave unit 10 in which the synchronization signal can be appropriately detected because a frame head is found out by acquiring a ratio of the first pulse width to the second pulse width.

The data receiving apparatus according to Japanese Patent Application Publication (JP-P2006-311237A) will be described. The slave unit 10 includes an edge detecting section 11, a timer 12, a storage section 13, a comparing section 14, a baud rate calculating section 15, a receiving section 16, a transmitting section 17, and a control section 18.

The edge detecting section 11 acquires the binary signal transmitted from the master unit 20 on the bus 30, and detects rising edges of the binary signal P such as L, N and O and falling edges thereof such as K and M. The timer 12 starts at the falling edge and stops at the rising edge. The storage section 13 stores a value of the timer when the timer 12 stops. The comparing section 14 acquires a ratio of a value of the timer 12 to a value stored in the storage section 13 in advance when the timer 12 stops. If the ratio outputted from the comparing section 14 is equal to or more than the predetermined value of, for example, 11, the baud rate calculating section 15 acquires a baud rate of the binary signal P transmitted from the master unit 20 by using an inverse number of a value of the timer 12. It should be noted that a numerical value of 11 is based on the specification of the LIN protocol. The receiving section 16 receives the binary signal P on the bus 30 in accordance with the acquired baud rate. The transmitting section 17 transmits a data signal such as a response to the data signal received by the receiving section 16, onto the bus 30 as needed in accordance with an acquired baud rate. The control section 18 controls the edge detecting section 11, the timer 12, the storage section 13, the receiving section 16 and the transmitting section 17.

An operation of the slave unit 10 to receive the binary signal P will be described. FIG. 2A is a flowchart showing a main process in the slave unit 10 according to the Japanese Patent Application Publication (JP-P2006-311237A). FIG. 2B is a flowchart showing an interrupting process at the falling edge of the binary signal P. FIG. 2C is a flowchart showing the interrupting process at the rising edge of the binary signal P.

A main process shown in FIG. 2A will be first described. The slave unit 10 executes an initializing process to set a variable W100 for storing a pulse width to 0 (step S11), set a variable W200 for storing a pulse width to 0 (step S12), and set a measurement flag M for indicating a state of measuring to 1 so as to represent a measuring state (step S13). Then, an interruption is permitted at the edge of the binary signal P (step S14).

The slave unit 10 waits for completion of the measurement in which the measurement flag M indicates 0 at a step S36 to be described later (step S15). That is, the slave unit 10 checks whether or not the measurement flag M indicates 1, and the step S15 is repeated if the measurement flag M indicates 1. If the measurement flag M does not indicate 1 (i.e. indicates 0), the process flow advances to a step S16 on the assumption that measurement is completed. The slave unit 10 ends a series of processes by prohibiting the interrupting process in the edge detection (step S16).

Next, an interrupting process at a falling edge of the binary signal P will be described with reference to FIG. 2B. The slave unit 10 starts an interrupting process if the edge detecting section 11 detects falling of the binary signal P in a state of permission of the edge interruption. In the falling edge interrupting process, the slave unit 10 executes initialization of the timer 12 (step S21) and start of the timer (step S22). The slave unit 10 returns to the process of the step S15 to determine a state of the measurement flag M in the state of permission of the edge interruption.

Next, an interrupting process at the rising edge of the binary signal P will be described with reference to FIG. 2C. The slave unit 10 starts the interrupting process if the edge detecting section 11 detects the rising edge of the binary signal P in the state of permission of the edge interruption. In the rising edge interrupting process, the slave unit 10 stops the timer 12 (step S31), and sets a value of the timer 12 to the variable W200 (step S32). The slave unit 10 determines whether W100/W200 is equal to or more than 11 (step S33). If W100/W200 is equal to or more than 11, the process flow advances to a step S35 on the assumption that a frame head is detected. In contrast, if W100/W200 is less than 11, the process flow advances to a step S34 on the assumption that a frame head is not detected. It should be noted that, when the process starts by passes through a step S33 initially, the process flow advances to a step S34 because W100 is 0.

The slave unit 10 substitutes the variable W200 for the variable W100 if W100/W200 is less than 11 (step S34). Then, the interrupting process at the rising edge is ended and the process flow returns to the step S15 to wait for subsequent pulse width measurement. If W100/W200 is equal to or more than 11, the slave unit 10 acquires a baud rate by 1/(t×W200) because the variable W200 has a count value of the timer corresponding to one bit width (step S35). Here, t is a resolution of the timer 12. The slave unit 10 sets the measurement flag M to 0 after calculating the baud rate (step S36). Then, the interrupting process at the rising edge is ended and the process flow returns to the step S15.

The slave unit 10 in Japanese Patent Application Publication (JP-P2006-311237A) operates as stated above to obtain a ratio of a first pulse width (i.e. W100) to a second pulse width (i.e. W200). If an acquired ratio is equal to or more than 11, it is determined that the first pulse corresponds to Synch Break and a binary signal following the second pulse corresponds to Synch Field. Then, a baud rate is calculated on the basis of a value of the variable W200 to receive a data field thereafter.

FIG. 3 partially shows a normal binary signal S in the LIN communication protocol. As shown by points A and B in FIG. 3, Synch Break represents a start of a frame in the LIN communication protocol. That is, a time interval between A and B corresponds to a period of time required to transfer a signal in the low level equal to or more than 11 bits. An interval between C and D in a subsequent low level by putting the high level shows a part of Synch Field. Synch Field is modulated for every one bit. That is, the interval between C and D represents a period of time required to transfer one bit. Furthermore, an interval between D and F in the high level and an interval between E and F in the low level show a part of Synch Field similar to that of the interval between C and D, and represent a period of time required to transfer one bit. Synch Field is followed by data in the LIN communication protocol, which is omitted to explain here.

FIG. 4 shows an example in which an abnormal pulse is included in the binary signal S in the LIN communication protocol. Referring to FIG. 4, an interval between a and b shows normal Synch Break in the low level, and an interval between c and d shows an abnormal pulse resulting from external noise or other causes. If the binary signal S shown in FIG. 4 includes the interval between c and d which is an abnormal pulse and a ratio of a pulse width of the interval between a and b relative to a pulse width of the interval between c and d is equal to or more than 11, a technique in Japanese Patent Application Publication (JP-P2006-311237A) may possibly result in erroneously determining that the interval between a and b represents Synch Break and the interval between c and d corresponds to a period of time to transfer one bit in Synch Field. More specifically, Japanese Patent Application Publication (JP-P2006-311237A) can cope with the normal binary signal S as shown in FIG. 3, but it is difficult to sufficiently deal with the binary signal S which includes an abnormal pulse as shown in FIG. 4.

SUMMARY

In an aspect of the present invention, a data receiving apparatus includes: a measuring section configured to measure a first pulse width of a first pulse, a second pulse width of a second pulse and a third pulse width of a third pulse, during each of which a first signal level of a reception signal is continuous, wherein the first pulse, the second pulse, and the third pulse are sequentially and continuously received by putting a portion of a second signal level different from the first signal level between the first and second pulse and the second and third pulse; a first comparing section configured to perform a first determination based on a measured value of the first pulse width and a measured value of the second pulse width, wherein the first determination is that the first pulse indicates a start of the reception signal and the second pulse indicates a synchronization signal; a second comparing section configured to perform a second determination based on the measured value of the first pulse width and the measured value of the second pulse width, wherein the second determination is that the second pulse and the third pulse indicate the synchronization signal; and a control section configured to determine the second pulse as a head of the synchronization signal, based on the first determination of the first comparing section and the second determination of the second comparing section.

In another aspect of the present invention, a data receiving method is achieved by measuring a first pulse width of a first pulse, a second pulse width of a second pulse and a third pulse width of a third pulse, during each of which a first signal level of a reception signal is continuous, wherein the first pulse, the second pulse, and the third pulse are sequentially and continuously received by putting a portion of a second signal level different from the first signal level between the first and second pulses and the second and third pulses; by performing a first determination that the first pulse indicates a start of the reception signal and the second pulse indicates a synchronization signal, based on a measured value of the first pulse width and a measured value of the second pulse width; by performing a second determination that the second pulse and the third pulse indicate the synchronization signal, based on the measured value of the second pulse width and a measured value of the third pulse width; and by determining the second pulse as a head of the synchronization signal based on the first and second determinations.

In still another aspect of the present invention, a computer-readable storage medium in which a computer-executable program code is stored for the above data receiving method.

The data receiving apparatus according to the present invention can enhance communication reliability by avoiding malfunctions because Synch Field can be accurately detected even if a signal in LIN is influenced by noise or other factors.

BRIEF DESCRIPTION OF THE DRAWINGS

The above and other objects, advantages and features of the present invention will be more apparent from the following description of certain embodiments taken in conjunction with the accompanying drawings, in which:

FIG. 1 is a block diagram showing a configuration example of a communication system in related art;

FIGS. 11A and 11B are a flowchart showing an operation of the communication system including the slave unit according to the second embodiment of the present invention.

DESCRIPTION OF THE PREFERRED EMBODIMENTS

Hereinafter, a data receiving apparatus used in a communication system according to the present invention will be described in detail with reference to the attached drawings.
[First Embodiment]

Figure 5:
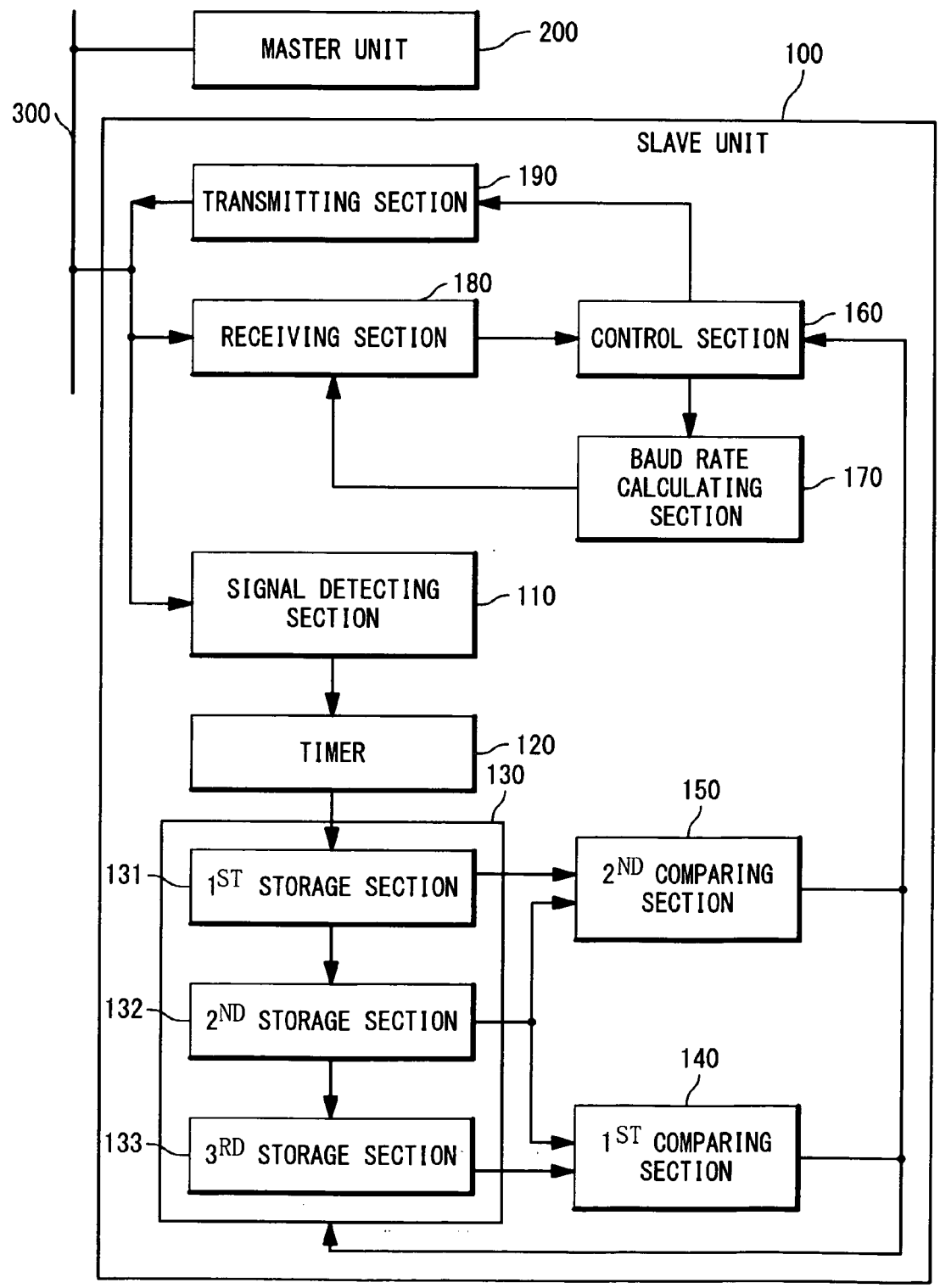
FIG. 5 is a block diagram showing a configuration example of a communication system including a slave unit according to a first embodiment of the present invention.

FIG. 5 is a block diagram showing a configuration example of a communication system according to the first embodiment of the present invention. Referring to FIG. 5, the communication system includes a slave unit 100, a master unit 200 and a bus 300. The slave unit 100 receives a binary signal transmitted from the master unit 200 via the bus 300. The slave unit 100 also transmits to the master unit 200 as needed, a response to the binary signal received via the bus 300.

The master unit 200 transmits the binary signal to the slave unit 100 via the bus 300. The master unit 200 also receives a binary signal to be transmitted from the slave unit 100 via the bus 300. The bus 300 connects the slave unit 100 and the master unit 200 to allow transmission/reception of data of the binary signal therebetween.

The slave unit 100 includes a signal detecting section 110, a timer 120, a storage section 130, a first comparing section 140, a second comparing section 150, a control section 160, a baud rate calculating section 170, a receiving section 180 and a transmitting section 190. The signal detecting section 110 receives the binary signal transmitted from the master unit 200 and outputs to the timer 120, data of a high level and low level in the binary signal by continuously detecting the high level and the low level. It should be noted that the signal detecting section 110 may operate to detect an edge changing from the high level to the low level and an edge changing from the low level to the high level in the binary signal and to provide the timer 120 with the detected edges.

Figure 2A:
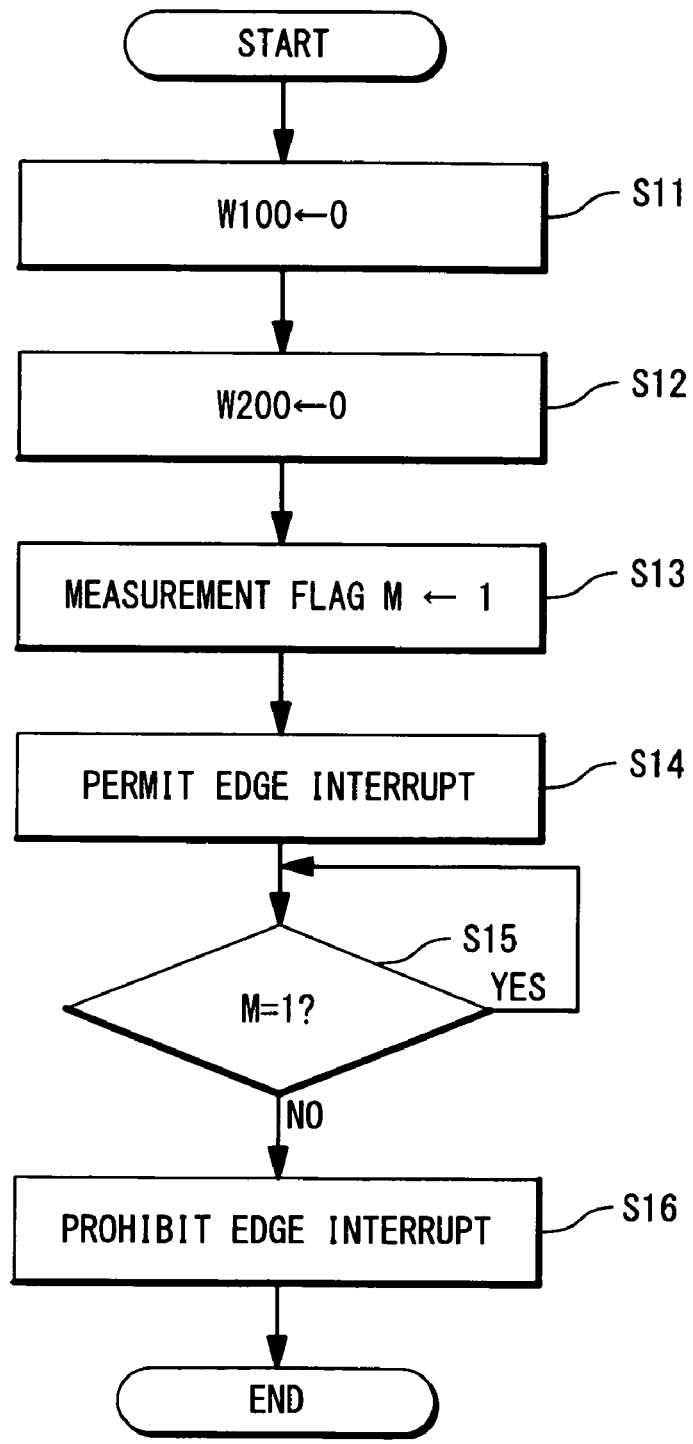
FIG. 2A is a flow chart showing a main process in a slave unit in the related art.
Figure 2B:
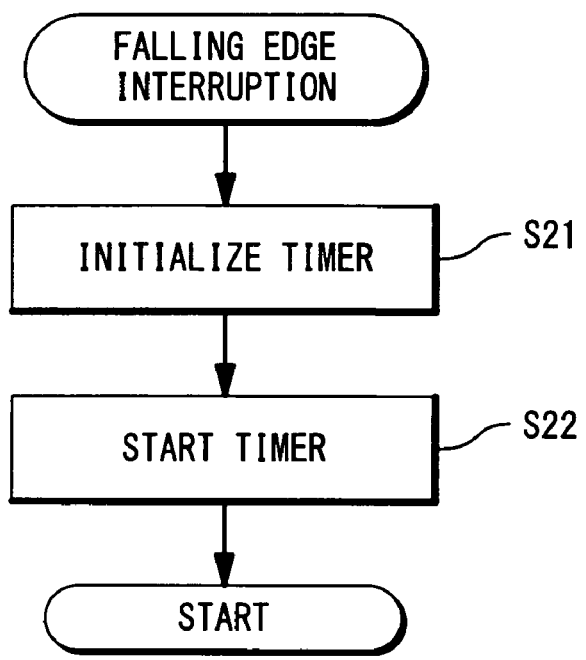
FIG. 2B is a flowchart showing an interrupting process at a falling edge of the binary signal P.
Figure 2C:
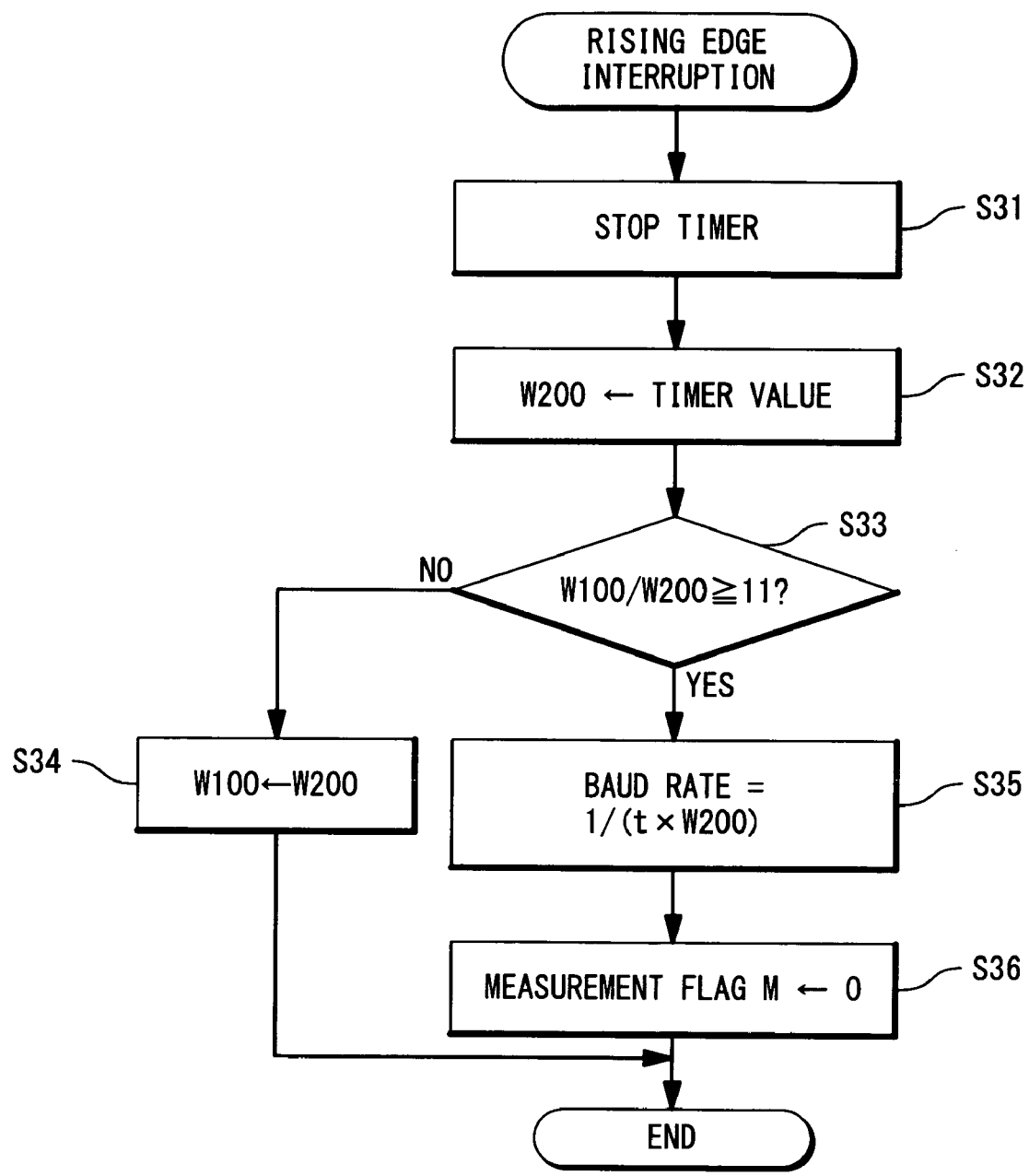
FIG. 2C is a flowchart showing an interrupting process at a rising edge of the binary signal P.
Figure 3:
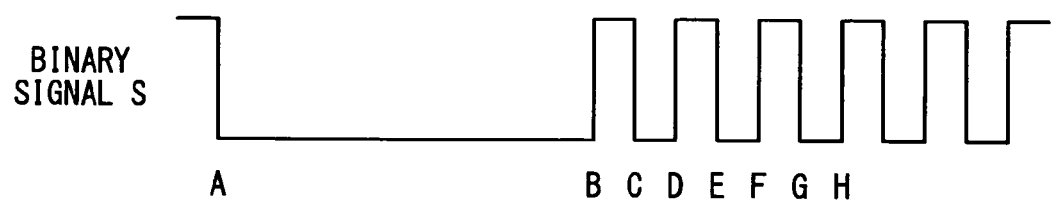
FIG. 3 is a time chart partially showing a normal binary signal S in the LIN communication protocol.
Figure 4:
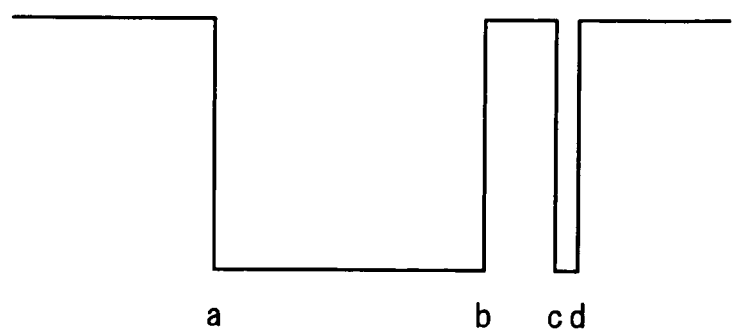
FIG. 4 is a time chart showing an example of an abnormal pulse included in the binary signal S in the LIN communication protocol.

Now, a case that the slave unit 100 acquires the binary signal S (e.g. A to F) transmitted from the master unit 200 as shown in FIG. 3 will be described. The signal detecting section 110 detects the low level at A and supplies the timer 120 with a signal indicating the low level. The signal detecting section 110 supplies the timer 120 with the signal indicating the low level as long as detecting the low level. The signal detecting section 110 detects a change from the low level to the high level at B, and supplies the timer 120 with a signal indicating the high level. That is, the signal detecting section 110 supplies the timer 120 with the signal indicating the low level between A and B (i.e. first pulse width). Similarly, the signal detecting section 110 supplies the timer 120 with a signal indicating the high level between B and C, and supplies the timer 120 with the signal indicating the low level between C and D (i.e. second pulse width). The signal detecting section 110 operates at D and thereafter in a similar manner. It should be noted that the signal detecting section 110 may transmit the data of the edge changing from the high level to the low level at A to the timer 120. The signal detecting section 110 may further transmit the data of the edge changed from the low level to the high level at B to the timer 120. The signal detecting section 110 operates at C and thereafter in a similar manner.

The timer 120 acquires the data of the high level and the low level supplied from the signal detecting section 110. The timer 120 performs measurement while receiving the data indicating the low level. Then, the measurement is stopped when the data indicating the high level is received. That is, the timer 120 measures a low-level pulse width of the binary signal received from the master unit 200. The measurement is performed based on the resolution of t (second) in the timer 120. More specifically, if the measured value W of a pulse width is 104 and the resolution t of 1·s, the measured value W of the pulse width can be expressed as the time of $0.000001 \times 104$ (second). It should be note that the timer 120 can operate to perform the measurement while acquiring the data indicating the high level and to stop the measurement while the data indicating the low level is obtained. Also, in case of obtaining the data indicating an edge from the signal detecting section 110, the timer 120 may perform measurement based on the data indicating the edge changed from the high level to the low level, and stop the measurement based on the data indicating an edge changed from the low level to the high level.

Here, in case of receiving the binary signal S shown in FIG. 3, the timer 120 acquires the data indicating the low level between A and B (i.e. first pulse width), between C and D (i.e. second pulse width), and between E and F (i.e. third pulse width) from the signal detecting section 110. The timer 120 similarly acquires the data indicating the high level between B and C and between D and E. The timer 120 performs the measurement to acquire the data indicating the low level between A and B (i.e. first pulse width), between C and D (i.e. second pulse width), and between E and F (i.e. third pulse width). In case of acquiring the data indicating edges, the timer 120 similarly performs the measurement of pulse widths between A and B, between C and D, and between E and F.

The timer 120 supplies the measured value W of the pulse width to the storage section 130. The timer 120 supplies the measured value W to the storage section 130 every time ending the measurement of the pulse width. In case of obtaining the binary signal S shown in FIG. 3, the timer 120 supplies a measured value W10 to the storage section 130 when the measurement of a time interval between A and B (i.e. first pulse width) is ended. Similarly, the timer 120 supplies a measured value W20 to the storage section 130 when the measurement of a time interval between C and D (i.e. second pulse width) is ended, and a measured value W30 when the measurement of a time interval between E and F (i.e. third pulse width) is ended.

The storage section 130 acquires the measured values W from the timer 120 and supplies them to the first comparing section 140 and the second comparing section 150. A detailed example of the storage section 130 will be described. The storage section 130 includes a first storage section 131, a second storage section 132 and a third storage section 133. The first storage section 131 acquires and stores the measured value W supplied from the timer 120. If the measured value W is newly supplied from the timer 120, the first storage section 131 transfers the measured value W stored therein to the second storage section 132. The second storage section 132 acquires and stores the measured value W supplied from the first storage section 131. If the measured value W is newly supplied from the first storage section 131, the second storage section 132 transfers the measured value W stored therein to the third storage section 133. The third storage section 133 acquires and stores the measured value W supplied from the second storage section 132. If the measured value W is newly supplied from the second storage section 132, the third storage section 133 deletes the measured value W stored therein. That is, the storage section 130 sequentially shifts the measured value W supplied from the timer 120 from the first storage section 131 to the second storage section 132 to the third storage section 133. Then, the first storage section 131 supplies the stored measured value W to the second comparing section 150. The second storage section 132 supplies the stored measured value W to the first comparing section 140 and the second comparing section 150. The third storage section 133 supplies the stored measured value W to the first comparing section 140. It should be noted that the storage section 130 is not limited to this example and the measured value W obtained from the timer 120 may also be directly stored in each of the first storage section 131, the second storage section 132 and the third storage section 133.

In case of receiving the binary signal S shown in FIG. 3, the storage section 130 sequentially acquires the measured value W10 of the interval between A and B (i.e. first pulse width), the measured value W20 of the interval between C and D (second pulse width), and the measured value W30 of the interval between E and F (third pulse width). That is, when the storage section 130 acquires the measured value W30 of the interval between E and F (i.e. third pulse width), the first storage section 131 stores the measured value W30 of the interval between E and F, the second storage section 132 stores the measured value W20 of the interval between C and D, and the third storage section 133 stores the measured value W10 of the interval between A and B.

The first comparing section 140 obtains two of the measured values W from the storage section 130 and determines whether or not the obtained measured values W satisfy a condition. The condition used by the first comparing section 140 is that "the measured value W in the third storage section 133 corresponds to Synch Break and the measured value W in the second storage section 132 corresponds to Synch Field".

A detailed example of the first comparing section 140 will be described. The first comparing section 140 acquires the measured value W from the third storage section 133 and the measured value W from the second storage section 132. The first comparing section 140 has a calculation equation and a determination criterion in order to determine whether the above condition is met. For example, the calculation equation can be given as (measured value w from the third storage section 133)/(measured value W from the second storage section 132). Then, the first comparing section 140 uses a calculation resultant value obtained from this calculation equation and the determination criterion to determine whether the above condition is met. The determination criterion is, for example, "a calculation resultant value is larger than a set value" or "a calculation resultant value is equal to or more than a set value". If a calculation resultant value satisfies the determination criterion, it means that the condition is satisfied. Any calculation equation, determination criterion and set value can be specified by a user to determine whether the condition is met. For example, in order to determine whether or not the measured value W from the third storage section 133 corresponds to Synch Break in LIN and the measured value W from the second storage section 132 corresponds to Synch Field, a set value should be 11 which is a ratio of a period of time required to transfer Synch Break in LIN to a period of time required to transfer one bit in Synch Field. That is, if a value calculated by use of the above calculation equation is equal to or more than 11, the measured value W from the third storage section 133 can be regarded as Synch Break and the measured value W from the second storage 132 can be regarded as Synch Field. However, the slave unit 100 does not determine Synch Break and Synch Filed only from the determination by the first comparing section 140. If the obtained measured value W satisfies the condition, the first comparing section 140 supplies the data satisfying the condition as a determination result to the control section 160. It should be noted that the first comparing section 140 can operate to supplies the data indicating non-satisfaction of the condition to the control section 160.

Here, in case of obtaining the binary signal S shown in FIG. 3, the first comparing section 140 acquires the measured value W10 of the interval between A and B from the third storage section 133 and the measured value W20 of the interval between C and D from the second storage section 132. The first comparing section 140 has a calculation equation and calculates a value by dividing the measured value W10 by the measured value W20. In order to determine whether the condition of "the measured value W10 corresponds to Synch Break and the measured value W20 corresponds to Synch Field" is met, a criterion to determine the calculated values is "being equal to or more than 11". If the calculated value is equal to or more than 11, the first comparing section 140 supplies the data satisfying the condition as the determination result to the control section 160.

The second comparing section 150 acquires two of the measured values W from the storage section 130 to determine whether or not the obtained measured values W satisfy a condition. The condition for use in the determination by the second comparing section 150 is "both the measured value W in the first storage section 131 and the measured value W in the second storage section 132 correspond to Synch Field". A detailed example of the second comparing section 150 will be described. The second comparing section 150 acquires the measured value W from the first storage section 131 and the measured value W from the second storage section 132. The second comparing section 150 has a calculation equation to calculate an error value and a determination criterion in order to determine whether the above condition is met. For example, the calculation equation can be (the measured value W from the second storage section 131)−(the measured value W from the first storage section 131). Then, the second comparing section 150 uses a calculation resultant value (i.e. error value) obtained from this calculation equation and the determination criterion to determine whether the above condition is met. The determination criterion is, for example, "an error value is within an allowable error range". Examples of an allowable error include "being within one twentieth of a period of time required to transfer one bit in Synch Field". If an error value satisfies the determination criterion, it means that the condition is satisfied. Any calculation equation, determination criterion and allowable error range can be set by a user to determine whether the condition is met. Since the second comparing section 150 determines whether both of the measured value W from the first storage section 131 and the measured value W from the second storage section 132 correspond to Synch Field, a small error value observed between the measured value W from the second storage section 132 and the measured value W from the first storage section 131 suggests that both of them can be regarded as Synch Field. However, the slave unit 100 does not determine Synch Field only from the determination by the second comparing section 150. If the condition is satisfied, the second comparing section 150 supplies the data satisfying the condition as a determination result to the control section 160. It should be noted that the second comparing section 150 can also operate to provide the data indicating non-satisfaction of the condition to the control section 160.

Here, in case of obtaining the binary signal S shown in FIG. 3, the second comparing section 150 acquires the measured value W20 of the interval between C and D from the second storage section 132 and the measured value W30 of the interval between E and F from the first storage section 131. The second comparing section 150 has a calculation equation and calculates a value by (measured value W20−measured value W30). In order to determine whether a condition of "the measured value W20 and the measured value W30 correspond to Synch Field" is met, a criterion to determine a calculation resultant value is "being within one twentieth of a period of time required to transfer one bit in Synch Field". If an error value satisfies the determination criterion, the second comparing section 150 supplies the data satisfying the condition as a determination result to the control section 160.

The control section 160 acquires the determination results from the first comparing section 140 and the second comparing section 150. If the data satisfying the conditions are acquired from both the first comparing section 140 and the second comparing section 150, the control section 160 acquires the measured value W from the second storage section. The obtained measured value w is then supplied to the baud rate calculating section 170. That is, the control section 160 determines that the measured value W from the second storage section 132 corresponds to a start bit of Synch Field on the basis of the determination results from the first comparing section 140 and the second comparing section 150.

The control section 160 also acquires the binary signal transmitted by the master unit 200 from the receiving section 180, and provides various kinds of function sections arranged in the slave unit 100. It should be noted that the slave unit 100 has various circuits to cause the apparatus to function, but explanation and drawings irrelevant to the present invention will be omitted. The control section 160 acquires data to be transmitted to the master unit 200 from various functional sections, and supplies the data to the transmitting section 190.

In case of obtaining the binary signal shown in FIG. 3, the control section 160 acquires the determination results from the first comparing section 140 and the second comparing section 150. If the data satisfying the condition is acquired as the determination result of the first comparing section 140 and the data satisfying the condition is acquired as the determination result of the second comparing section 150, the control section 160 acquires the measured value W20 of the interval between C and D which has been stored in the second storage section 132. That is, the slave unit 100 determines Synch Break and Synch Field from the determination result of the first comparing section 140 (i.e. the interval between A and B corresponds to Synch Break and the interval between C and D corresponds to a start bit of Synch Field) and the determination result of the comparing section 150 (i.e. the interval between C and D corresponds to a start bit of Synch Field). Therefore, the control section 160 acquires a value of the measured value W20, which is determined as a start bit of Synch Field, from the second storage section 132, and supplies the acquired measured value W20 to the baud rate calculating section 170.

The baud rate calculating section 170 acquires the measured value W supplied from the control section 160. Then, a baud rate is calculated based on 1/(measured value W×resolution t) (1/second). Since one bit is transferred per one modulation in Synch Field, a data transfer rate should be 1 (bit)/(measured value W×resolution t) (bit/second). For example, if the resolution t is 1·s and the measured value W is 104, the baud rate should be 1/(0.000001×104)=9615 (1/second). Therefore, a data transfer rate should be 1 (bit)/(0.000001 (second)×104=9615 (bit/second). The baud rate calculating section 170 supplies a calculated baud rate to the receiving section 180.

The receiving section 180 acquires the baud rate from the baud rate calculating section 170. The receiving section 180 receives the binary signal transmitted from the master unit 200 on the basis of the acquired baud rate. The receiving section 180 supplies received the binary signal to the control section 160.

The transmitting section 190 transmits data supplied from the control section 160 to the master unit 200 via the bus 300.

Figure 6A:
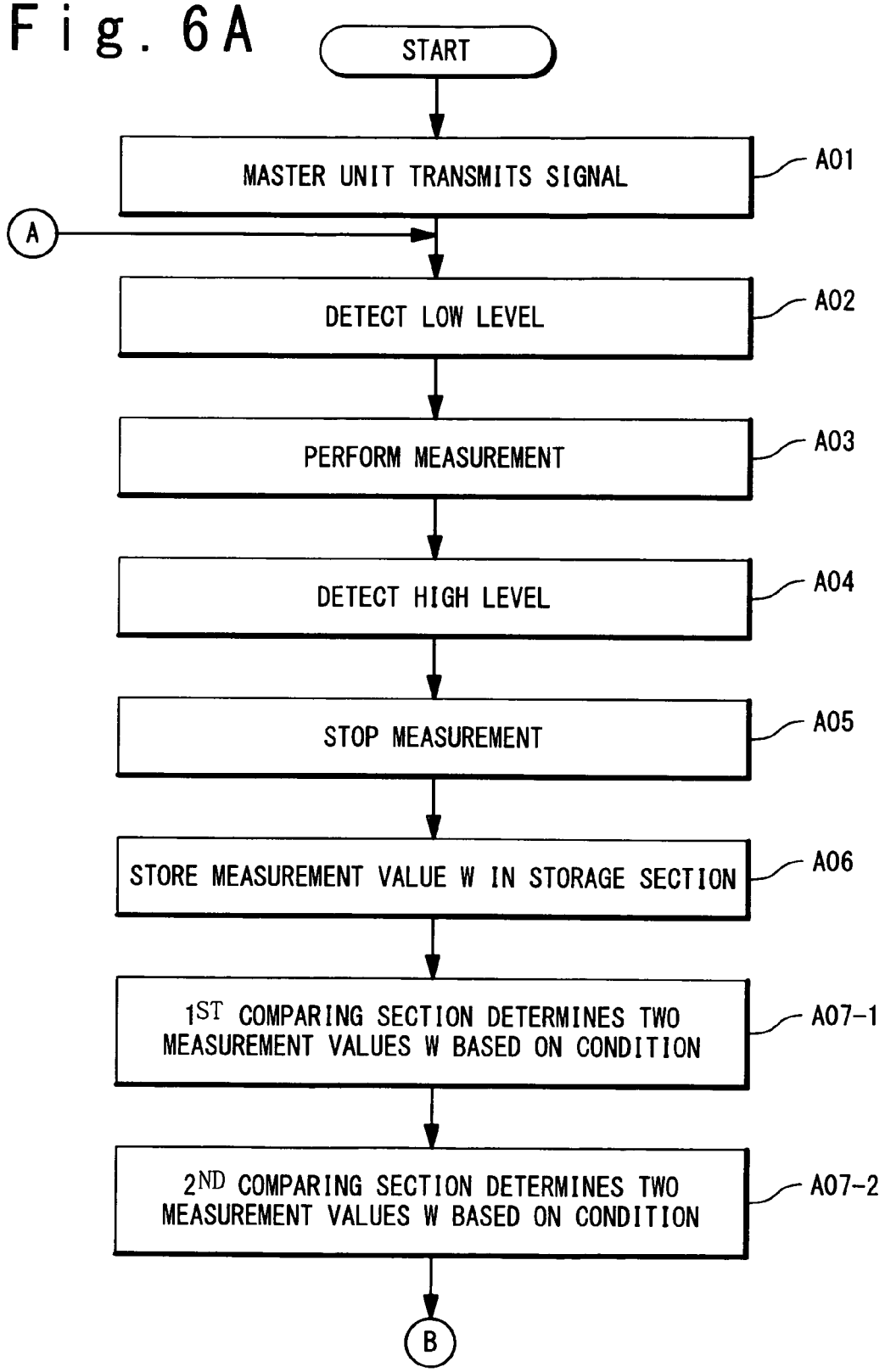
FIGS. 6A and 6B are a flowchart showing an operation of the communication system including the slave unit according to the first embodiment of the present invention.
Figure 6B:
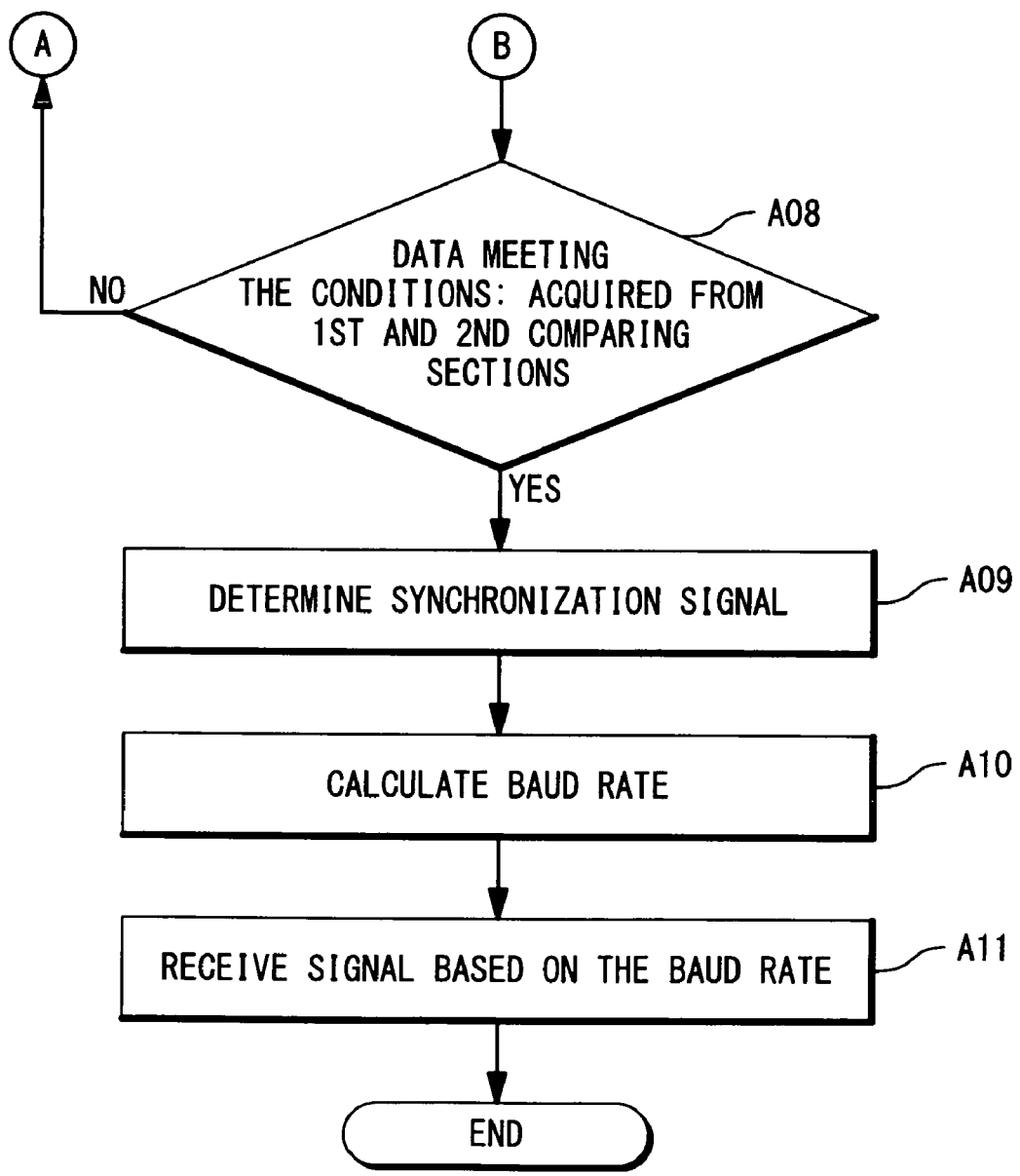

FIGS. 6A and 6B are a flowchart showing a process flow in the communication system including the slave unit 10 according to the first embodiment of the present invention. Referring to FIGS. 6A and 6B, a case that the slave unit 100 receives the binary signal S shown in FIG. 3 will be described.

The master unit 200 transmits the binary signal S shown in FIG. 3 via the bus 300 (step A01).

The signal detecting section 110 detects the low level at A and supplies a signal indicating the low level to the timer 120 during a period before reaching B. In case of supplying the data indicating an edge, the signal detecting section 110 detects an edge changing from the high level to the low level at A, and supplies the data indicating the edge to the timer 120 (step A02).

The timer 120 resets a measured value W when the signal indicating the low level at A is acquired. The timer 120 then acquires the signal indicating the low level from A to B, and measures the interval between A and B. The measurement is performed by using the resolution t (second) of the timer 120 as a reference. In case of acquiring only the data indicating the edge from the signal detecting section 110, the timer 120 resets the measured value on the basis of the data indicating an edge changing from the high level to the low level at A, and starts the measurement thereafter (step S03).

The signal detecting section 110 detects a change from the low level to the high level at B, and supplies the data indicating the high level to the timer 120. In case of acquiring only the data indicating the edge, the signal detecting section 110 supplies the data indicating an edge changing from the low level to the high level at B to the timer 120 (step A04).

When the signal indicating the high level at B is acquired from the signal detecting section 110, the timer 120 stops the measurement. In case of acquiring only the data indicating an edge from the signal detecting section 110, the timer 120 stops the measurement on the basis of the data indicating the edge changing from the low level to the high level at B (step A05). The timer 120 supplies the measured value W10 of the interval between A and B to the first storage section 131.

The first storage section 131 acquires the measured value W10 of the interval between A and B from the timer 120 (step A06). The first storage section 131 supplies the acquired measured value W10 of the interval between A and B to the second comparing section 150.

The first comparing section 140 has a condition of "the measured value W of the third comparing section 133 corresponds to Synch Break and the measured value W of the second storage section 132 corresponds to Synch Field". In order to determine whether the condition is met, a calculation equation is established as (measured value W of the third storage section 133)/(measured value W of the second storage section 132). A determination criterion is "being equal to or more than 11". If a calculation resultant value satisfies the determination criterion, it means that the condition is satisfied. The first comparing section 140 does not supplies the data satisfying the condition to the control section 160 because the measured value W is not acquired here (step A07-1).

The second comparing section 150 has a condition of "both the measured value W in the first storage section 131 and the measured value W in the second storage section 132 correspond to Synch Field". In order to determine whether the condition is met, a calculation equation for an error value should be (measured value W in the second storage section 132)−(measured value W in the first storage section 131). A determination criterion is established as "being within one twentieth of a period of time required to transfer one bit in Synch Field". If an error value satisfies the determination criterion, it means that the condition is satisfied. The second comparing section 150 acquires the measured value W10 of the interval between A and B from the first storage section 131. Since the second comparing section 150 here does not acquire the measured value W from the second storage section 132, the condition is not satisfied. Therefore, the second comparing section 150 does not supply the data satisfying the condition to the control section 160 (step A07-02). It should be noted that the step A07-1 and the step A07-2 can be executed in any order.

The control section 160 determines whether or not the data satisfying the conditions are acquired from both the first comparing section 140 and the second comparing section 150 (step A08). Since the data satisfying the conditions are not acquired from both of them here, the process flow will returns to the step A02.

An operation when the slave unit 100 operates to receive the binary signal indicating the interval between B and D as shown in FIG. 3 will be described. The signal detecting section 110 supplies the signal indicating the high level from B to C to the timer 120. If the signal detecting section 110 supplies only the data indicating an edge, the operation is similar to that of receiving the signal indicating the interval between A and B, and therefore the description will be omitted.

The timer 120 acquires the signal indicating the high level from B to C without measuring the interval between B and C. The signal detecting section 110 detects a change from the high level to the low level at C, and supplies the signal indicating the low level to the timer 120 (step A02).

The timer 120 resets the measured value W when the signal indicating the low level at C is acquired. Then, the timer 120 acquires the signal indicating the low level from C to D and measures the interval between C and D (step A03).

The signal detecting section 110 detects a change from the low level to the high level at D and supplies the signal indicating the high level to the timer 120 (step A04).

The timer 120 stops the measurement when the signal indicating the high level at D is acquired from the signal detecting section 110 (step A05). The timer 120 supplies the measured value W20 of the interval between C and D to the first storage section 131. The first storage section 131 acquires the measured value W20 of the interval between C and D from the timer 120 (step A06). The first storage section 131 supplies the measured value W10 of the interval between A and B to the second storage section 132. The first storage section 131 also supplies the acquired measured value W20 of the interval between C and D to the second comparing section 150.

The second storage section 132 acquires the measured value W10 of the interval between A and B. The second storage section 132 then supplies the acquired measured value W10 of the interval between A and B to the first comparing section 140 and the second comparing section 150. The first comparing section 140 acquires the measured value W10 of the interval between A and B from the second storage section 131. Here, the first comparing section 140 does not acquire the measured value W from the third storage section 133, so that the condition is not satisfied. Therefore, the first comparing section 140 does not supply the data satisfying the condition to the control section 160 (step A07-1).

The second comparing section 150 acquires the measured value W20 of the interval between C and D from the first storage section 131. The second comparing section 150 further acquires the measured value W10 from the second storage section 132. An error value is calculated by using the measured value W10 and the measured value W20. Since the measured value of the interval between A and B largely differs from the measured value if the interval between C and D and an error value does not satisfy the determination criterion, the second comparing section 150 does not supply the data satisfying the condition to the control section 160 (step A07-2).

The control section 160 determines whether the data satisfying the conditions are acquired from both the first comparing section 140 and the second comparing section 150 (step A08). Since the data satisfying the conditions are not acquired from both of them here, the process flow will return to the step A02.

The operation when the slave unit 100 operates to receive the binary signal indicating the interval between D and F as shown in FIG. 3 will be described. The signal detecting section 110 supplies the signal indicating the high level from D to E to the timer 120. If the signal detecting section 110 supplies only the data indicating an edge, the operation is similar to that of receiving the signal of the interval between A and B and explanation will be omitted.

The timer 120 acquires the signal indicating the high level from D to E without measuring the interval between D and E. The signal detecting section 110 detects a change from the high level to the low level at E and supplies the signal indicating the low level to the timer 120 (step A02)

The timer 120 resets the measured value W when the signal indicating the low level at E is acquired. Then, the timer 120 acquires the signal indicating the low level from E to F and measures the interval between E and F (step A03).

The signal detecting section 110 detects a change from the low level to the high level at F and supplies the signal indicating the high level to the timer 120 (step A04).

The timer 120 stops the measurement when the signal indicating the high level at F is acquired from the signal detecting section 110 (step A05). The timer 120 supplies the measured value W30 of the interval between E and F to the first storage section 131.

The first storage section 131 acquires the measured value W30 of the interval between E and F from the timer 120 (step A06). The first storage section 131 supplies the measured value W20 of the interval between C and D to the second storage section 132. The first storage section 131 also supplies the acquired measured value W30 of the interval between E and F to the second comparing section 150. The second storage section 132 acquires the measured value W20 of the interval between C and D and supplies the measured value W10 of the interval between A and B to the third storage section 133. The second storage section 132 then supplies the acquired measured value W20 of the interval between C and D to the first comparing section 140 and the second comparing section 150. The third storage section 133 acquires the measured value W10 of the interval between A and B. The third storage section 133 supplies the measured value W10 to the first comparing section 140.

The first comparing section 140 acquires the measured value W20 of the interval between C and D from the second storage section 132. The first comparing section 140 further acquires the measured value W10 of the interval between A and B from the third storage section 133. The first comparing section 140 calculates a value by dividing the measured value W10 by the measured value W20. The first comparing section 140 determines whether or not a calculation resultant value is equal to or more than 11. If the calculation resultant value is equal to or more than 11, the first comparing section 140 supplies the data satisfying the condition to the control section 160. If the calculation resultant value is not equal to or more than 11, the data satisfying the condition is not supplied to the control section 160 (step A07-1).

The second comparing section 150 acquires the measured value W30 of the interval between E and F from the first storage section 131. The second comparing section 150 further acquires the measured value W20 of the interval between C and D from the second storage section 132. An error value between the measured value W20 and the measured value W30 is calculated. If the error value satisfies the determination criterion, the second comparing section 150 supplies the data satisfying the condition to the control section 160. When the condition is not satisfied, the data satisfying the condition will not be supplied to the control section 160 (step A07-2).

When the data satisfying the conditions are acquired from both of the first comparing section 140 and the second comparing section 150, the control section 160 acquires the measured value W20 from the second storage section 132. More specifically, it is determined that the interval between A and B corresponds to Synch Break in LIN and the interval between C and D corresponds to a start bit of Synch Field. The control section 160 supplies the acquired measured value W20 to the baud rate calculating section 170 (step A08 and step A09).

The baud rate calculating section 170 acquires the measured value W20 supplied from the control section 160. Then, a baud rate is calculated by 1/(measured value W20×resolution t) (1/second). Since one bit is transferred per one modulation in Synch Field, a data transfer rate should be 1/(measured value W20×resolution t) (bit/second). The baud rate calculating section 170 supplies a calculated baud rate to the receiving section 180 (step A10).

The receiving section 180 acquires the baud rate from the baud rate calculating section 170. The receiving section 180 receives the binary signal S transmitted from the master unit 200 on the basis of the acquired baud rate (step A11). The receiving section 180 supplies the received signal to the control section 160. The control section 160 acquires from the receiving section 180, the binary signal S transmitted from the master unit 200 to provide for various kinds of function sections arranged in the slave unit 100. The control section 160 acquires data to be transmitted to the master unit 200 from various kinds of the function sections to provide for the transmitting section 190. The transmitting section 190 transmits the data supplied from the control part to the master unit 200 via the bus 300.

The data receiving unit (i.e. slave unit 100) according to the present invention may have a CPU and a program to cause each or a part of the sections to function by the CPU executing the program. Each functional section shown in FIG. 5 will be described as a function block based on the CPU and a program on an assumption that the CPU is included in the control section 160. The program is stored in a storage medium (not shown) and loaded into the storage section 130. The program is executed by the CPU to realize the various functions of the slave unit.

Figure 7:
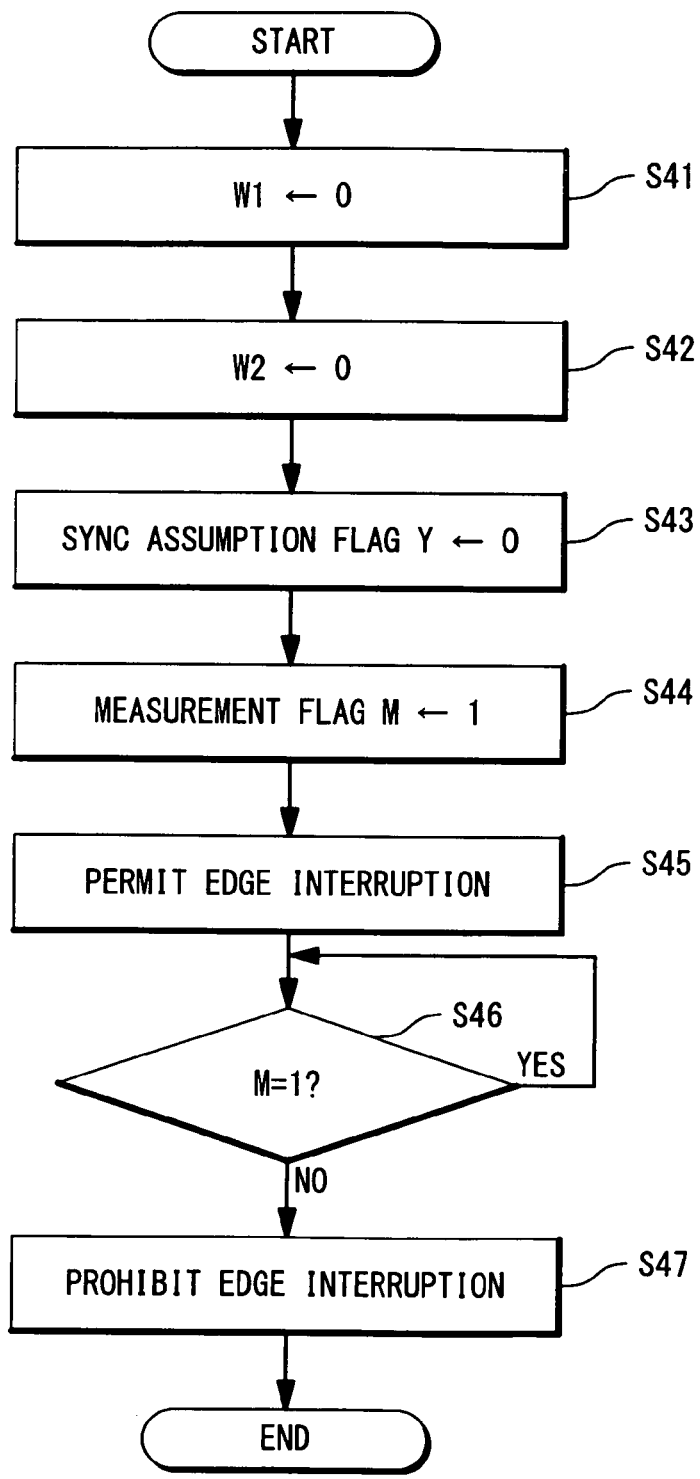
FIG. 7 is a flowchart showing an operation for a main process in a data receiving unit according to the first embodiment of the present invention.

FIG. 7 is a flowchart showing a main process in the data receiving unit (i.e. slave unit 100) according to the first embodiment of the present invention. Referring to FIG. 7, the operation of the slave unit 100 according to the first embodiment of the present invention will be described.

The storage section 130 sets a variable W1, which stores the measured value W of a pulse width, to 0 (step S41). The storage section 130 sets a variable W2, which stores the measured value W of the pulse width, to 0 (step S42).

The control section 160 has a synchronization assuming flag Y when a combination of Synch Break and Synch Field is assumed, and sets the synchronization assuming flag Y to 0 (step S43). Setting the synchronization assuming flag Y to 1 means that the above condition of "the measured value W in the third storage section 133 corresponds to Synch Break and the measured value W in the second storage section 132 corresponds to Synch Field" is satisfied.

The signal detecting section 110 has a measurement flag M indicating a state of measurement, and sets the measurement flag M to 1 to be brought into a measuring state (step S44). The signal detecting section 110 detects an edge of the binary signal S and permits interruption at the edge (step S45). The signal detecting section 110 waits for completion of measurement in which the measurement flag M indicates 0 (step S46). Details of a state of measurement completion will be described later. The signal detecting section 110 repeats the step S46 as long as the measurement flag M indicates 1. If the measurement flag M does not indicate 1 (i.e. indicates 0), the signal detecting section 110 advances to step S47 on the assumption that the measurement is completed. If the measurement flag M does not indicate 1, the slave unit 100 ends a series of operations by prohibiting an interruption at an edge (step S47).

Figure 8:
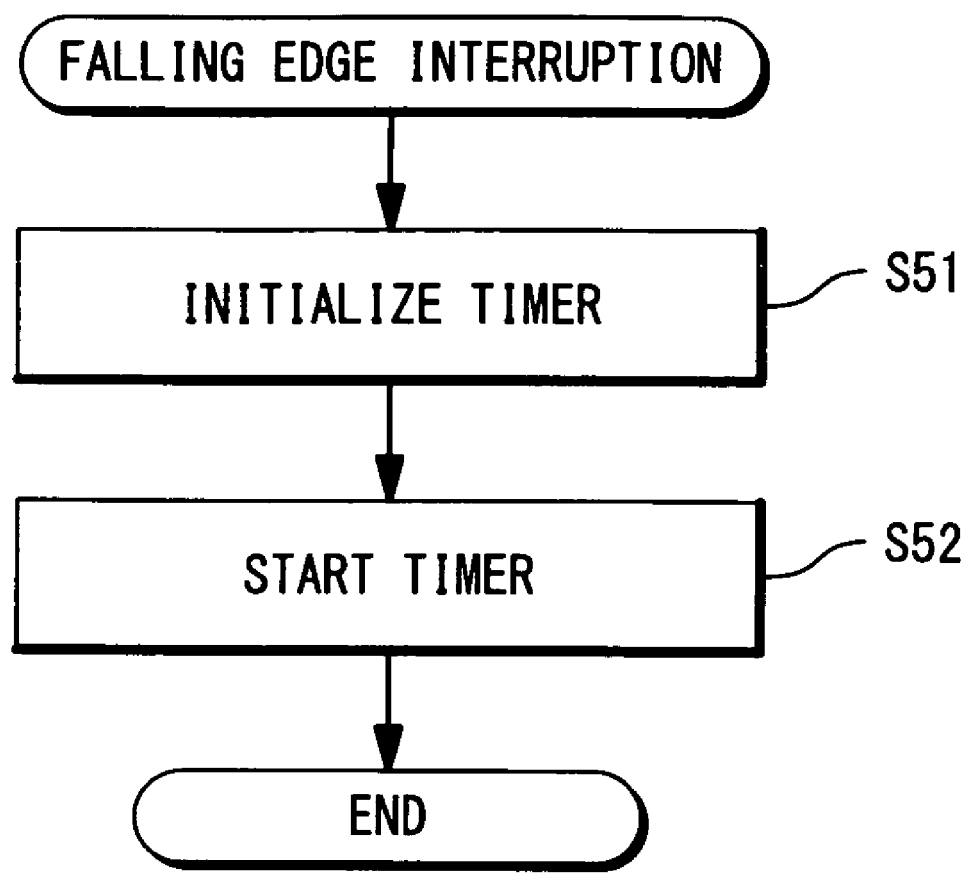
FIG. 8 is a flowchart showing an operation for a falling edge interrupting process in the data receiving unit according to the first embodiment of the present invention.

FIG. 8 is a flowchart showing a falling edge interrupting process in the data receiving unit (i.e. slave unit 100) according to the first embodiment of the present invention. Referring to FIG. 8, the interrupting process at a falling edge of the binary signal S will be described. When the signal detecting section 110 detects the falling edge of the binary signal S (e.g. A in FIG. 3) in a state of permission of edge interruption at the step S45 shown in FIG. 7, the slave unit 100 starts the interrupting process. The signal detecting section 110 supplies the data indicating the edge changed from the high level to the low level in the binary signal S to the timer 120. The timer 120 initializes a measured value on the basis of the data indicating the edge changed from the high level to the low level (step S51). The timer 120 then starts the measurement (step S52). The steps S51 and S52 correspond to the steps A02 to A03 in FIG. 6A, respectively.

Figure 9:
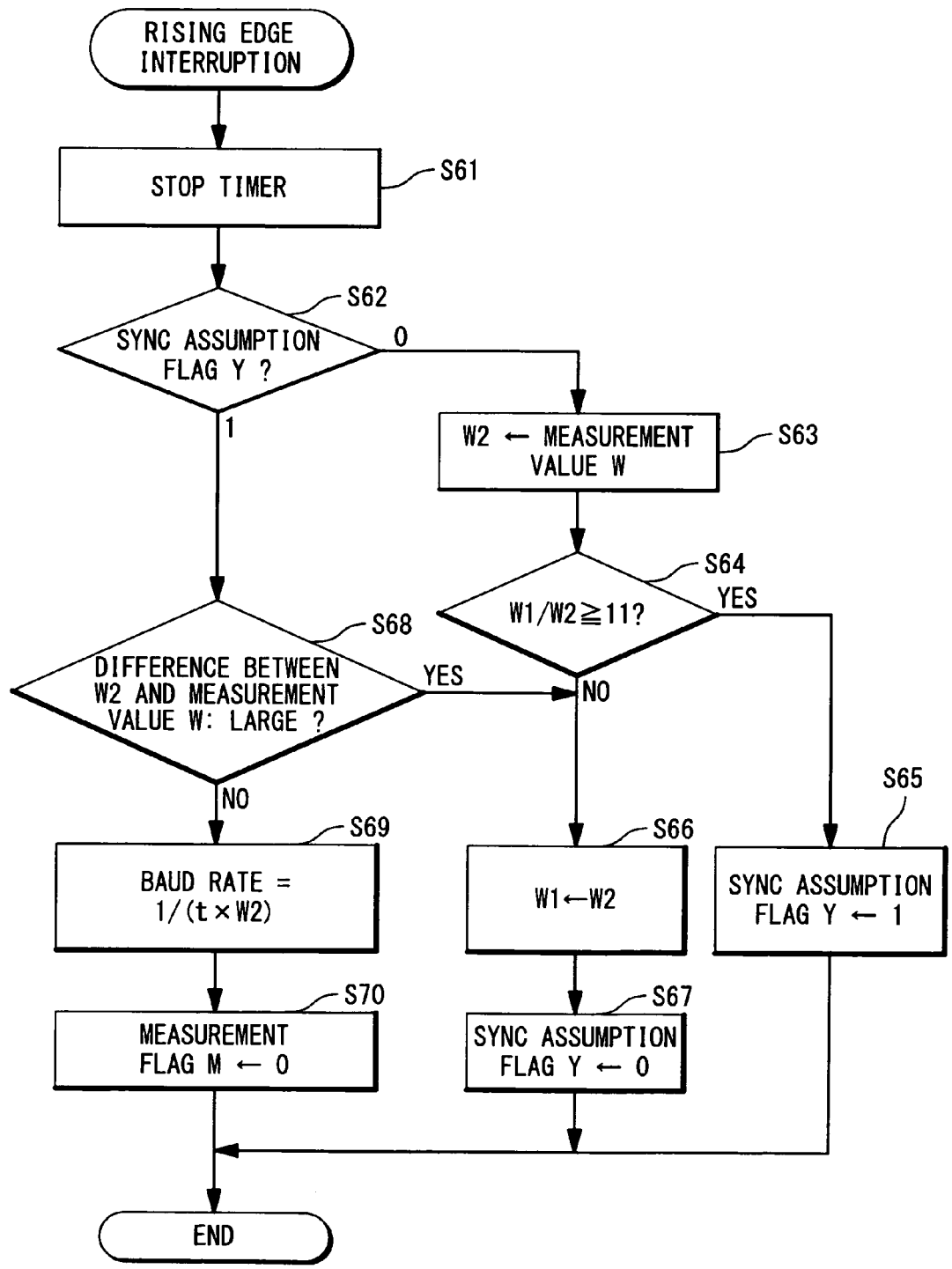
FIG. 9 is a flowchart showing an operation for a rising edge interrupting process in the data receiving unit according to the first embodiment of the present invention.

FIG. 9 is a flowchart showing a rising edge interrupting process in the data receiving unit (i.e. slave unit 100) according to the first embodiment of the present invention. Referring to FIG. 9, the interrupting process at rising edge of the binary signal S will be described. When the signal detecting section 110 detects the rising edge of the binary signal S (e.g. B in FIG. 3) in the state of permission of the edge interruption at the step S45 shown in FIG. 7 after the operation in FIG. 8, the slave unit 100 starts the interrupting process. The signal detecting section 110 supplies the data indicating the edge changed from the low level to the high level in the binary signal S to the timer 120. The timer 120 stops the measurement on the basis of the data on the edge changed from the low level to the high level. The timer 120 supplies the measured value W to the storage section 130 (step S61). The step S61 corresponds to the steps A04 to A06 in FIG. 6A.

The control section 160 determines whether the synchronization assuming flag Y indicates 1 or 0 (step S62). If the control section 160 determines at the step S62 that the synchronization assuming flag Y indicates 0, the storage section 130 stores a value of the measured value W of the variable W2 (step S63). The storage section 130 supplies the variable W1 and the variable W2 to the first comparing section 140.

The first comparing section 140 has a condition of "the measured value W of the variable W1 corresponds to Synch Break and the measured value W of the variable W2 corresponds to Synch Field". The first comparing section 140 has a calculation equation of "variable W1/variable W2" and a determination criterion of "being equal to or more than 11", in order to determine whether the condition is met. The first comparing section 140 determines whether or not the calculation resultant value satisfies the determination criterion (step S64). If a calculation resultant value is equal to or more than 11, it means that the first comparing section 140 regards the measured value W of the variable W1 as Synch Break in LIN and the measured value W of the variable W2 as Synch Field. If the calculation resultant value is less than 11, it means that Synch Break and Synch Field are not found. It should be noted that the process flow starts by passing through the step S64 initially, and the process flow will advances to step S66 because the variable W1 is 0. The step S64 corresponds to the step A07-1 in FIG. 6A.

If the calculation resultant value is equal to or more than 11 at the step S64, the control section 160 sets the synchronization assuming flag Y to 1 (step S65). Thereafter, the slave unit 100 ends the rising edge interrupting process, followed by being brought into the state of permission of the edge interruption at the step S45 shown in FIG. 7 and determining Synch Field on the basis of a subsequent pulse. If the calculation resultant value is less than 11 at the step S64, the storage section 130 deletes a value of the variable W1 and sets a value of the variable W2 into the variable W2 (step S66).

The control section 160 sets the synchronization assuming flag Y to 0 (step S67). Thereafter, the slave unit 100 ends the rising edge interrupting process, followed by being brought into the state of permission of the rising edge interruption at the step S45 shown in FIG. 7.

If the control section 160 determines at the step S62 that the synchronization assuming flag Y indicates 1, the storage section 130 supplies the measured value W and the variable W2 to the second comparing section 150. At this time, the synchronization assuming flag Y indicates 1, which indicates that the condition of "the measured value W of the variable W1 corresponds to Synch Break and the measured value W of the variable W2 corresponds to Synch Field" is satisfied. The second comparing section 150 has a condition of "both the measured value W of the variable W2 and the measured value W correspond to Synch Field". The second comparing section 150 calculates an error value between the measured value W and the variable W2. Here, the second comparing section 10 has a calculation equation for an error as "variable W2−measured value W", and a determination criterion which is "being within one twentieth of a period of time required to transfer one bit in Synch Field". The second comparing section 150 determines whether or not an error value satisfies the determination criterion (step S68). It should be noted that the first comparing section 140 and the second comparing section 150 may be configured in the same functional section in case of an operation using the program and the CPU in the slave unit 100 according to the first embodiment. The step S68 corresponds to the step A07-2 in FIG. 6A.

If the error value is too large to satisfy the determination criterion in the step S68, the process flow will advances to the step S66. That is, the control section 160 regards the measured value W or the variable W2 as an abnormal pulse resulting from external noise or other causes. If the error value satisfies the determination criterion at the step S68, the storage section 130 supplies the variable W2 to the baud rate calculating section 170. More specifically, it means that determination of the measured value W of the variable W2 to be a start bit of Synch Field has been achieved. The operation here corresponds to the steps A08 and A09 in FIG. 6B.

The baud rate calculating section 170 acquires the variable W2, which is determined as the start bit of Synch Field, from the storage section 130. Then, the baud rate is calculated by 1/(variable W2×resolution t) (1/second). Since one bit is transferred per one modulation in Synch Field, the data transfer rate should be 1 (bit)/(variable W2×resolution t) (bit/second). The baud rate calculating section 170 supplies the calculated baud rate to the receiving section 180 (step S69). The receiving section 180 receives the binary signal from the master unit 200 on the basis of the acquired baud rate. The step S69 corresponds to the step A10 in FIG. 6B.

The signal detecting section 110 sets the measurement flag M to 0 and ends the rising edge interrupting process (step S70). The slave unit 100 then advances to the step S46 as shown in FIG. 7.

The slave unit 100 according to the first embodiment can detect Synch Field accurately even if a signal in LIN is influenced by noise or other factors. It is because, instead of using a ratio of a first pulse width to a second pulse width in a received binary signal to determine that a pulse of the second pulse width corresponds to Synch Field, the slave unit 100 determines that a pulse of the second pulse width corresponds to Synch Field, through further verification of an error between the second pulse width and a third pulse width. It is difficult to detect Synch Field accurately in LIN in general because the slave unit 100 operates asynchronously with respect to the master unit 200 and a Synch Break signal is further specified to have an indefinite length. However, the slave unit 100 according to the present invention can detect Synch Field more accurately, exhibiting an effect of enhancing communication reliability while avoiding malfunctions.

[Second Embodiment]

Figure 10:
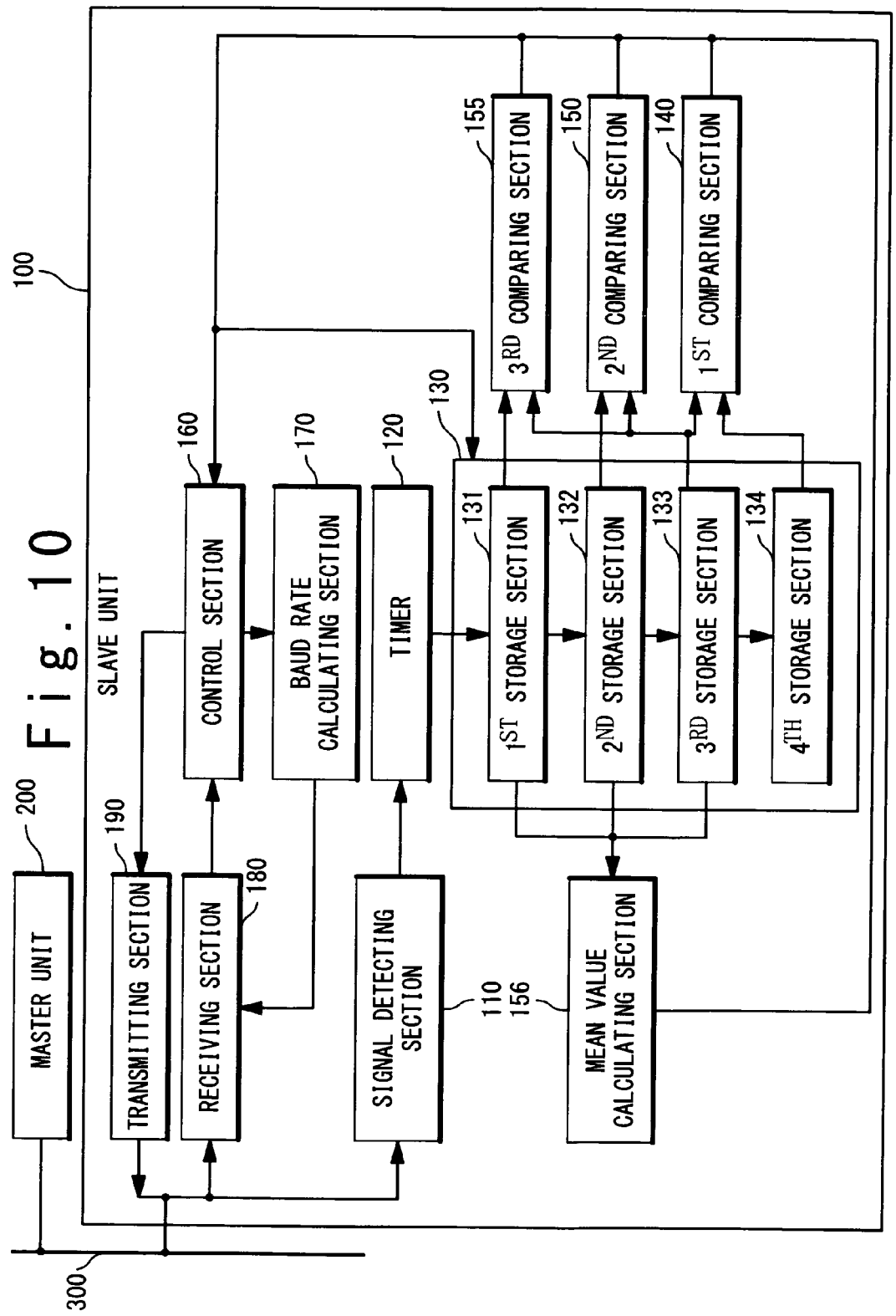
FIG. 10 is a block diagram showing a configuration example of the communication system including the slave unit according to a second embodiment of the present invention.

Next, a second embodiment of the present invention will be described. The second embodiment of the present invention makes it possible to further accurately determine an abnormal pulse resulting from noise or other causes and avoid malfunctions in comparison with the first embodiment. FIG. 10 is a block diagram showing a configuration example of a communication system including the slave unit 100 according to the second embodiment of the present invention. Referring to FIG. 10, the communication system includes the slave unit 100, the master unit 200 and the bus 300. The master unit 200 and the bus 300 operate in the same manner as the first embodiment.

The slave unit 100 has the signal detecting section 110, the timer 120, the storage section 130, the first comparing section 140, the second comparing section 150, a third comparing section 155, a mean value calculating section 156, the control section 160, the baud rate calculating section 170, the receiving section 180 and the transmitting section 190. The storage section 130 includes the first storage section 131, the second storage section 132, the third storage section 133 and a fourth storage section 134. The second embodiment of the present invention has a configuration further including the fourth storage section 134 in the storage device 130, the third comparing section 155 and the mean value calculating section 156 in addition to the configuration of the first embodiment. The signal detecting section 110, the timer 120, the receiving section 180, the transmitting section 190, and the master unit 200 are configured and operate in the same manner as the first embodiment.

The storage section 130 acquires the measured value W from the timer 120. The storage section 130 supplies the acquired measured value W to the first comparing section 140, the second comparing section 150, the third comparing section 155 and the mean value calculating section 156. A detailed example of the storage section 130 according to the second embodiment will be described. The storage section 130 includes the first storage section 131, the second storage section 132, the third storage section 133 and the fourth storage section 134. In the same manner as the first embodiment, the storage section 130 sequentially shifts the measured value W supplied from the timer 120 from the first storage section 131 to the second storage section 132, the third storage section 133 and the fourth storage section 134. Moreover, the first storage section 131 supplies the acquired measured value W to the third comparing section 155. The second storage section 132 supplies the acquired measured value W to the second comparing section 150. The third storage section 133 supplies the acquired measured value W to the first comparing section 140, the second comparing section 150 and the third comparing section 155. The fourth storage section 134 supplies the acquired measured value W to the first comparing section 140. Furthermore, the first storage section 131, the second storage section 132 and the third storage section 133 provide the acquired measured value W to the mean value calculating section 156. It should be noted that the storage section 130 is not limited to this detailed example.

Each of the first comparing section 140, the second comparing section 150 and the third comparing section 155 acquires two of the measured values W from the storage section 130 in order to determine whether or not the acquired measured values satisfy the condition. A condition determined by the first comparing section 140 is "the measured value W in the fourth storage section 134 corresponds to Synch Break and the measured value W in the third storage section 133 corresponds to Synch Field". A detailed example of the first comparing section 140 will be described. The first comparing section 140 acquires the measured value W from the third storage section 133 and the measured value W from the fourth storage section 134. The first comparing section 140 has a calculation equation and a determination criterion, in order to determine whether the above condition is met. For example, the calculation equation can be (measured value W from the fourth storage section 134)/(measured value W from the third storage section 133). The first comparing section 140 then determines whether the above condition is met on the basis of a value calculated in the calculation equation and a determination criterion. The determination criterion can be, for example, "being equal to or more than 11 (i.e. set value)". If a calculation resultant value satisfies the determination criterion, it means that the condition is satisfied. Any calculation equation, determination criterion and set value or other means can be set by a user to determine whether the condition is met. However, the slave unit 100 does not determine Synch Break and Synch Field only from the determination by the first comparing section 140. If the acquired measured value W satisfies the condition, the first comparing section 140 supplies the data satisfying the condition as a determination result to the control section 160.

A condition determined by the second comparing section 150 is "both the measured value W in the second storage section 132 and the measured value in the third storage section 133 correspond to Synch Field". A detailed example of the second comparing section 150 will be described. The second comparing section 150 acquires the measured value W in the second storage section 132 and the measured value W in the third storage section 133. The second comparing section 150 has a calculation equation to calculate an error and a determination criterion, in order to determine whether the above condition is met. For example, the calculation equation can be (measured value W in the third storage section 133–(measured value W in the second storage section 132). If an error value acquired from this calculation equation satisfies the determination criterion, the second comparing section 150 determines the condition is satisfied. An example of the determination criterion is similar to that of the first embodiment. Any calculation equation, determination criterion and allowable error can be set by a user to determine whether the condition is met. If a small error is observed between the measured value W in the second storage section 132 and the measured value W in the third storage section 133, the second comparing section 150 regards both of them as Synch Field. However, the slave unit 100 does not determine Synch Field only from the determination by the second comparing section 150. If the condition is satisfied, the second comparing section 150 supplies the data satisfying the condition as a determination result to the control section 160.

The third comparing section 155 carries out determination similar to that of the second comparing section 150. A condition used in determination by the third comparing section 155 is "both the measured value W in the first storage section 131 and the measured value W in the third storage section 133 correspond to Synch Field". A detailed example of the third comparing section 155 will be described. The third comparing section 155 acquires the measured value W from the first storage section 131 and the measured value W from the third storage section 133. The third comparing section 155 calculates an error value by using the measured value W from the first storage section 131 and the measured value W from the third storage section 133 in the same manner as the second comparing section 150. If an error value satisfies a determination criterion, the third comparing section 155 determines that the condition is satisfied. An example of the determination criterion is similar to that of the second comparing section 150. Any calculation equation, determination criterion and allowable error can be set by a user to determine whether the condition is met. If a small error is observed between the measured value W in the second storage section 132 and the measured value W in the third storage section 133, the third comparing section 155 regards both of them as Synch Field. However, the slave unit 100 does not determine Synch Field only from the determination by the third comparing section 155. If the condition is satisfied, the third comparing section 155 supplies the data satisfying the condition as a determination result to the control section 160. The second embodiment of the present invention is configured to realize more accurate determination by arranging the third comparing section 155 to increase the number of pulse widths to be measured for determination of Synch Field.

The mean value calculating section 156 acquires the measured value W held by each of the first storage section 131, the second storage section 132 and the third storage section 133. Then, a mean value of the measured values W is calculated.

The control section 160 acquires the determination results from the first comparing section 140, the second comparing section 150 and the third comparing section 155. The control section 160 then acquires the mean value calculated by the mean value calculating section 156 when the data satisfying the condition is acquired from each of the first comparing section 140, the second comparing section 150 and the third comparing section 155. More specifically, it means that the control section 160 determines that the measured value W in the fourth storage section 134 corresponds to Synch Break and the measured value W in the third storage section 133 corresponds to Synch Field on the basis of the determination results from the first comparing section 140, the second comparing section 150 and the third comparing section 155. In order to determine the measured value W in the third storage section 133 corresponds to Synch Field, an error among the measured values W in the first storage section 131 and the second storage section 132 and the measured value W in the third storage section 133 is determined to be small, and thus more accurate determination is performed. The control section 160 then supplies an acquired mean value to the board rate calculating section 170.

In the same manner as the first embodiment, the control section 160 also acquires the binary signal transmitted from the master unit 200 from the data receiving section 180, in order to provide various kinds of function sections arranged in the slave unit 100. The control section 160 further acquires data to be transmitted to the master unit 200 from the various kinds of the function sections to provide for the transmitting section 190.

The baud rate calculating section 170 acquires a mean value supplied from the control section 160. Then, a baud rate is calculated by 1/(mean value×resolution t) (1/second) in the same manner as the first embodiment. One bit is transferred per one modulation in Synch Field, so that the data rate should be 1/(mean value×resolution t) (bit/second). The baud rate calculating section 170 supplies the calculated baud rate to the receiving section 180. The receiving section 180 and the transmitting section 170 operate in the same manner as the first embodiment and description thereof will be omitted.

Figure 11B:
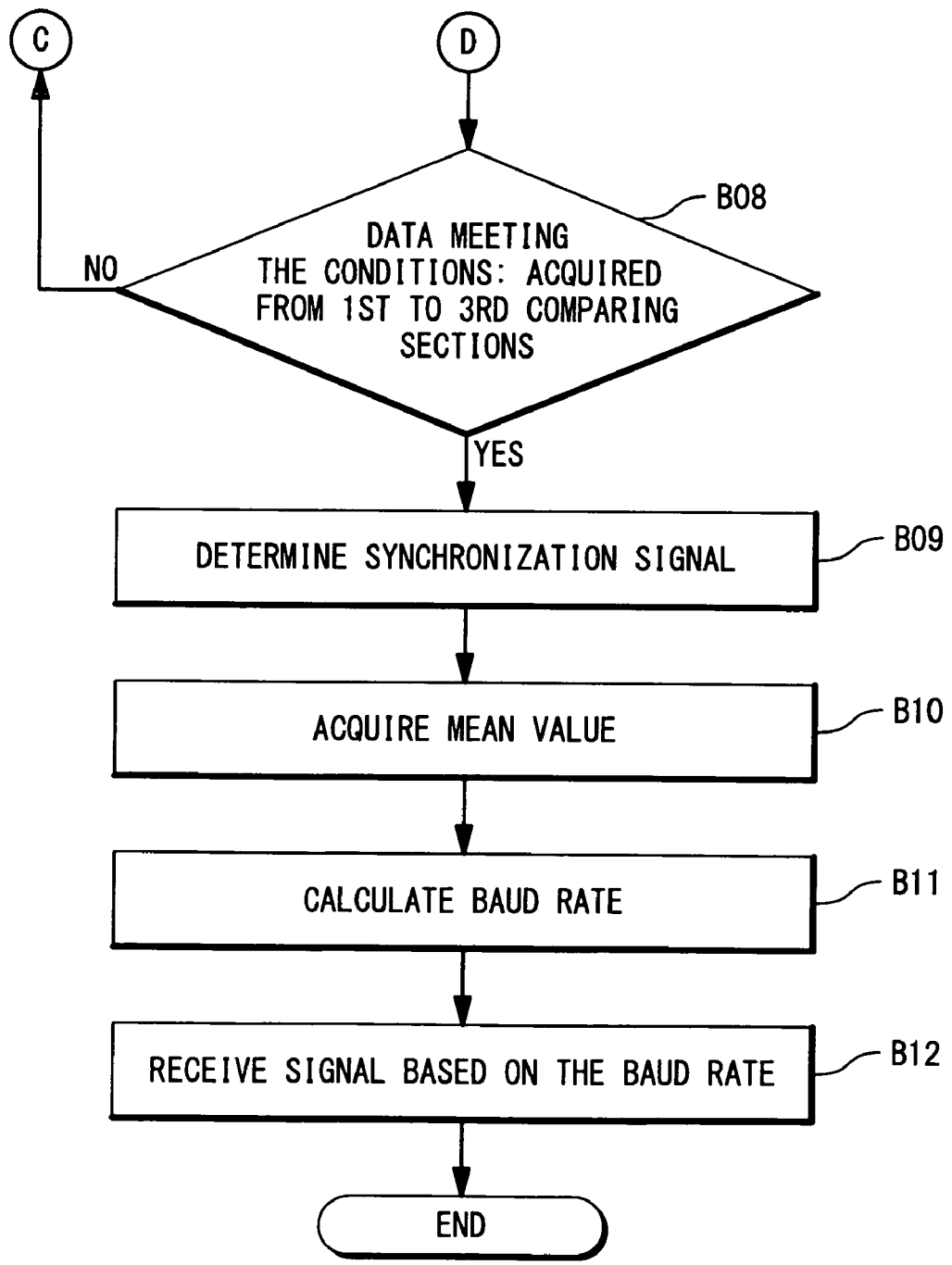

FIGS. 11A and 11B are a flowchart showing an operation of the communication system including the slave unit 100 according to the second embodiment of the present invention. Referring to FIGS. 11A and 11B, a case in which the slave unit 100 receives the binary signal S shown in FIG. 3 will be described.

The master unit 200 transmits the binary signal S shown in FIG. 3 via the bus 300 (step B01). Operations of the signal detecting section 110 and the timer 120 (i.e. step B02 to B05) are similar to those of the first embodiment (steps A02 to A05) and the description thereof will be omitted. The first storage section 131 acquires the measured value W10 of the interval between A and B from the timer 120 (step B06). The first storage section 131 supplies the acquired measured value of the interval between A and B to the third comparing section 155 and the mean value calculating section 156.

The first comparing section 140 has the condition of "the measured value W in the fourth comparing section 134 corresponds to Synch Break and the measured value W in the third storage section 133 corresponds to Sync Field". In order to determine whether the condition is met, the calculation equation is set as (measured value W in the fourth storage section 134)/(measured value W in the third storage section 133). The determination criterion is set as "being equal to or more than 11". If the calculation resultant value satisfies the determination criterion, it means that the condition is satisfied. The first comparing section 140 does not supply the data satisfying the condition to the control section 160 because the measured value W is not acquired here (Step B07-1).

The second comparing section 150 has the condition of "both the measured value W in the second storage section 132 and the measured value W in the third storage section 133 correspond to Synch Field". The calculation equation for an error value is set as (measured value W in the third storage section 133)−(measured value w of the second storage section 132) in order to determine whether the condition is met. A determination criterion should be "being within one twentieth of a period of time required to transfer one bit in Synch Field". If the error value satisfies the determination criterion, it means that the condition is satisfied. The condition is not satisfied here because the second comparing section 150 does not acquire the measured value W. Therefore, the second comparing section 150 does not supply the data satisfying the condition to the control section 160 (step B07-2). It should be noted that the step A07-1 and the step A-7-2 can be executed in any order.

The third comparing section 155 has the condition of "both the measured value W in the first storage section 131 and the measured value W in the third storage section 133 correspond to Synch Field". In order to determine whether the condition is met, a calculation equation for an error value is set as (measured value W in the third storage section 133)−(measured value W in the first storage section 131). A determination criterion should be "being within one twentieth of a period of time to transfer one bit in Synch Field". If the error value satisfies the determination criterion, it means that the condition is satisfied. The third comparing section 155 acquires the measured value W10 of the interval between A and B from the first storage section 131. Then, the error is calculated. The condition is not satisfied here because the third comparing section 155 does not acquire the measured value W from the third storage section 155. Therefore, the third comparing section 155 does not supply the data satisfying the condition to the control section 160 (step B07-3). It should be noted that the step B07-1, the step B07-2 and the step B07-3 can be executed in any order.

The control section 160 determines whether the data satisfying the conditions are acquired from all of the first comparing section 140, the second comparing section 150 and the third comparing section 155 (step B08). Since the data satisfying the conditions are not acquired from all of them, the process flow will advances to the step B02.

Next, an operation of the slave unit 100 to receive the binary signal indicating the interval between B and D as shown in FIG. 3 will be described. The first storage section 131 acquires the measured value W20 of the interval between C and D from the timer 120 (step B06). The first storage section 131 supplies the measured value W10 of the interval between A and B to the second storage section 132. The first storage section 131 supplies the acquired measured value W20 of the interval between C and D to the third comparing section 155 and the mean value calculating section 156. The second storage section 132 acquires the measured value W10 of the interval between A and B. The second storage section 132 then supplies the acquired measured value W10 of the interval between A and B to the second comparing section 150 and the mean value calculating section 156.

The first comparing section 140 does not supply the data satisfying the condition to the control section 160 because the measured value w is not acquired (step B07-1). The second comparing section 150 acquires the measured value W10 of the interval between A and B from the second storage section 132. The condition is not satisfied because the second comparing section 150 does not acquire the measured value W from the third storage section 133. Therefore, the second comparing section 150 does not supply the data satisfying the condition to the control section 160. Similarly the third comparing section 155 does not obtain the measured value W from the third storage section 133, so that the condition is not satisfied (step B07-2, step B07-3).

The mean value calculating section 156 acquires the measured value W10 of the interval between A and B and the measured value W20 of the interval between C and D. Then, a mean value of the two measured values is calculated and the mean value is held. The control section 160 determines whether the data satisfying the conditions are acquired from all of the first comparing section 140, the second comparing section 150 and the third comparing section 155 (step B08). The data satisfying the conditions are not acquired from all of them here, so that the process will advances to the step B02.

Next, an operation of the slave unit 100 to receive the binary signal indicating the interval between E and F as shown in FIG. 3 will be described. The first storage section 131 acquires the measured value W30 of the interval between E and F from the timer 120 (step B06). The first storage section 131 supplies the measured value W20 of the interval between C and D to the second storage section 132. The first storage section 131 also supplies the acquired measured value W30 of the interval between E and F to the third comparing section 155 and the mean value calculating section 156. The second storage section 132 acquires the measured value W20 of the interval between C and D and supplies the measured value W10 in the interval between A and B to the third storage section 133. The second storage section 132 then supplies the acquired measured value W20 of the interval between C and D to the second comparing section 150 and the mean value calculating section 156. The third storage section 133 acquires the measured value W10 of the interval between A and B. The third storage section 133 supplies the measured value W10 to the first comparing section 140, the second comparing section 150, the third comparing section 150 and the mean value calculating section 156.

The first comparing section 140 acquires the measured value W10 of the interval between A and B from the third storage section 133. The condition is not satisfied here because the first comparing section 140 does not acquire the measured value W from the fourth storage section 134. Therefore, the first comparing section 140 does not supply the data satisfying the condition to the control section 160 (step B07-1). The second comparing section 150 acquires the measured value W20 of the interval between C and D from the second storage section 132. The second comparing section 150 further acquires the a measured value W10 of the interval between A and B from the third storage section 133. An error between the measured value W10 and the measured value W20 is calculated. since the measured value W10 of the interval between A and B largely differs from the measured value W20 of the interval between C and D so that an error value does not satisfy the determination criterion, the second comparing section 150 does not supply the data satisfying the condition to the control section 160 (step B07-2).

The third comparing section 155 acquires the measured value W30 of the interval between E and F from the first storage section 131. The third comparing section 155 further acquires the measured value W10 of the interval between A and B from the third storage section 133. Then, an error between the measured value W10 and the measured value W20 is calculated. Since the measured value W10 of the interval between A and B largely differs from the measured value W30 of the interval between E and F and an error value does not satisfy the determination criterion, the third comparing section 155 does not supply the data satisfying the condition, to the control section 160 (step B07-3).

The mean value calculating section 156 acquires the measured value W10 of the interval between A and B, the measured value W20 of the interval between C and D, and the measured value W30 of the interval between E and F. Then, a mean value among the three measured values is calculated and the mean value is held. It should be noted that the mean value calculating section 156 deletes a mean value previously calculated. The control section 160 determines whether data which satisfy the conditions are acquired from all of the first comparing section 140, the second comparing section 150 and the third comparing section 155 (step B08). Since the data which satisfy the conditions are not yet acquired from all of them here, the process flow advances to the step B02.

Next, an operation of the slave unit 100 to receive the binary signal indicating an interval between G and H as shown in FIG. 3 will be described. The first storage section 131 acquires the measured value W40 of the interval between G and H from the timer 120 (step B06). The first storage section 131 supplies the measured value W30 of the interval between E and F to the second storage section 132. The first storage section 131 supplies the acquired measured value W40 of the interval between G and H to the third comparing section 155 and the mean value calculating section 156. The second storage section 132 acquires the measured value W30 of the interval between E and F and supplies the measured value W20 of the interval between C and D to the third storage section 133. The second storage section 132 then supplies the acquired measured value W30 of the interval between E and F to the second comparing section 150 and the mean value calculating section 156. The third storage section 133 acquires the measured value W20 of the interval between C and D and supplies the measured value W10 of the interval between A and B to the fourth storage section 134. The third storage section 133 then supplies the acquired measured value W20 of the interval between C and D to the first comparing section 140, the second comparing section 150, the third comparing section 155 and the mean value calculating section 156. The fourth storage section 134 acquires the measured value W10 of the interval between A and B. At this time, the fourth storage section 134 deletes any other measured value W which had been stored therein. The third storage section 133 then supplies the acquired measured value W10 of the interval between A and B to the first comparing section 140.

The first comparing section 140 acquires the measured value W20 of the interval between C and D from the third storage section 133 and the measured value W10 of the interval between A and B from the fourth storage section 134. The first comparing section 140 calculates a value by dividing the measured value W10 by the measured value W20. The first comparing section 140 determines whether or not a calculation resultant value is equal to or more than 11 (i.e. set value) of the determination criterion. If the calculation resultant value is equal to or more than 11, the first comparing section 140 supplies the data satisfying the condition to the control section 160. At this time, supplying the data satisfying the condition to the control section 160 means that the first comparing section 140 regards the measured value W10 of the interval between A and B as Synch Break and the measured value W20 of the interval between C and D as Synch Field (step B07-1).

The second comparing section 150 acquires the measured value W30 of the interval between E and F from the second storage section 132. The second comparing section 150 further acquires the measured value W20 of the interval between C and D from the third storage section 133. Then, an error between the measured value W30 and the measured value W20 is calculated. If an error value satisfies the determination criterion, the second comparing section 150 supplies the data satisfying the condition to the control section 160. At this time, supplying the data satisfying the condition to the control section 160 means that the second comparing section 150 regards the measured value W20 of the interval between C and D and the measured value W30 of the interval between E and F as Synch Field (step B07-2).

The third comparing section 155 acquires the measured value W40 of the interval between G and H from the first storage section 131. The third comparing section 155 further acquires the measured value W20 of the interval between C and D from the third storage section 133. Then, an error between the measured value W40 and the measured value W20 is calculated. If an error value satisfies the determination criterion, the third comparing section 155 supplies the data satisfying the condition to the control section 160. At this time, supplying the data satisfying the condition to the control section 160 means that the third comparing section 155 regards the measured value W20 of the interval between C and D and the measured value W40 of the interval between G and H as Synch Field (step B07-3).

The mean value calculating section 156 acquires the measured value W20 of the interval between C and D, the measured value W30 of the interval between E and F, and the measured value W40 of the interval between G and H. Then, a mean value among the three measured values is calculated and the mean value is held.

When the data satisfying the conditions are acquired from all of the first comparing section 140, the second comparing section 150 and the third comparing section 155, the control section 160 acquires a mean value from the mean value calculating section 156. More specifically, it was determined that the interval between A and B corresponds to Synch Break in LIN and the interval between C and D corresponds to the start bit of Synch Field (steps B08, B09 and B10). Furthermore, a value of Synch Field to be acquired by the control section 160 is a mean value among the three measured values, whereby a more accurate start bit can be acquired. The control section 160 supplies an acquired mean value to the baud rate calculating section 170. Processing operations to be carried out in the step B11 and thereafter are similar to those of the step A10 and thereafter in the first embodiment and explanation thereof will be omitted.

The slave unit 100 according to the second embodiment of the present invention may have a CPU and a program to cause each or a part of the slave unit 100 to a function by the CPU executing the program. Hardware A function block shown in FIG. 10 will be described based on the CPU and the program on an assumption that the CPU is included in the control section 160 and the program is included in the storage section 130. Processes which differ from those of the first embodiment will be described in a main operation (refer to FIG. 7) and the falling edge interrupting process (refer to FIG. 8) in the program. It should be noted that the step A51 and the step S52 in FIG. 8 correspond to the steps B02 to B03 in FIG. 11A.

Referring to FIG. 7, an operation of the slave unit according to the second embodiment of the present invention will be described. At a step S43, the control section 160 has a synchronization state variable Z used in assuming a combination of Synch Break and Synch Field. The synchronization state variable Z indicates whether or not a condition is satisfied. The synchronization state variable Z indicates 0 to represent a state that neither Synch break nor Synch Field can be detected. The synchronization state variable Z indicates 1 to represent a state that a pulse of the first pulse width is regarded as Synch Break and a pulse of the second pulse width is regarded as a start bit of Synch Field. Also, the synchronization state variable Z represents a state that a pulse of the second pulse width and a pulse of the third pulse width are both regarded as Synch Field. More specifically, it corresponds to satisfy the above conditions including "the measured value W in the fourth comparing section 134 corresponds to Synch Break and the measured value W in the third storage section 133 corresponds to Synch Field" and "both the measured value W in the second storage section 132 and the measured value W in the third storage section 133 correspond to Synch Field". The synchronization state variable Z indicates 2 to represent not only a state that the pulse of the first pulse width is regarded as Synch Break and the pulse of the second pulse width is regarded as a start bit of Synch Field, but also a state that neither the pulse of the second pulse width nor the pulse of the third pulse width cannot be regarded as Synch Field. More specifically, it corresponds to a state that only the above condition as "the measured value W in the fourth comparing section 134 corresponds to Synch Break and the measured value W in the third storage section 133 corresponds to Synch Field" is satisfied. The control section 160 sets the synchronization state variable Z to 0 at the initial setting (step S43).

Figure 12:
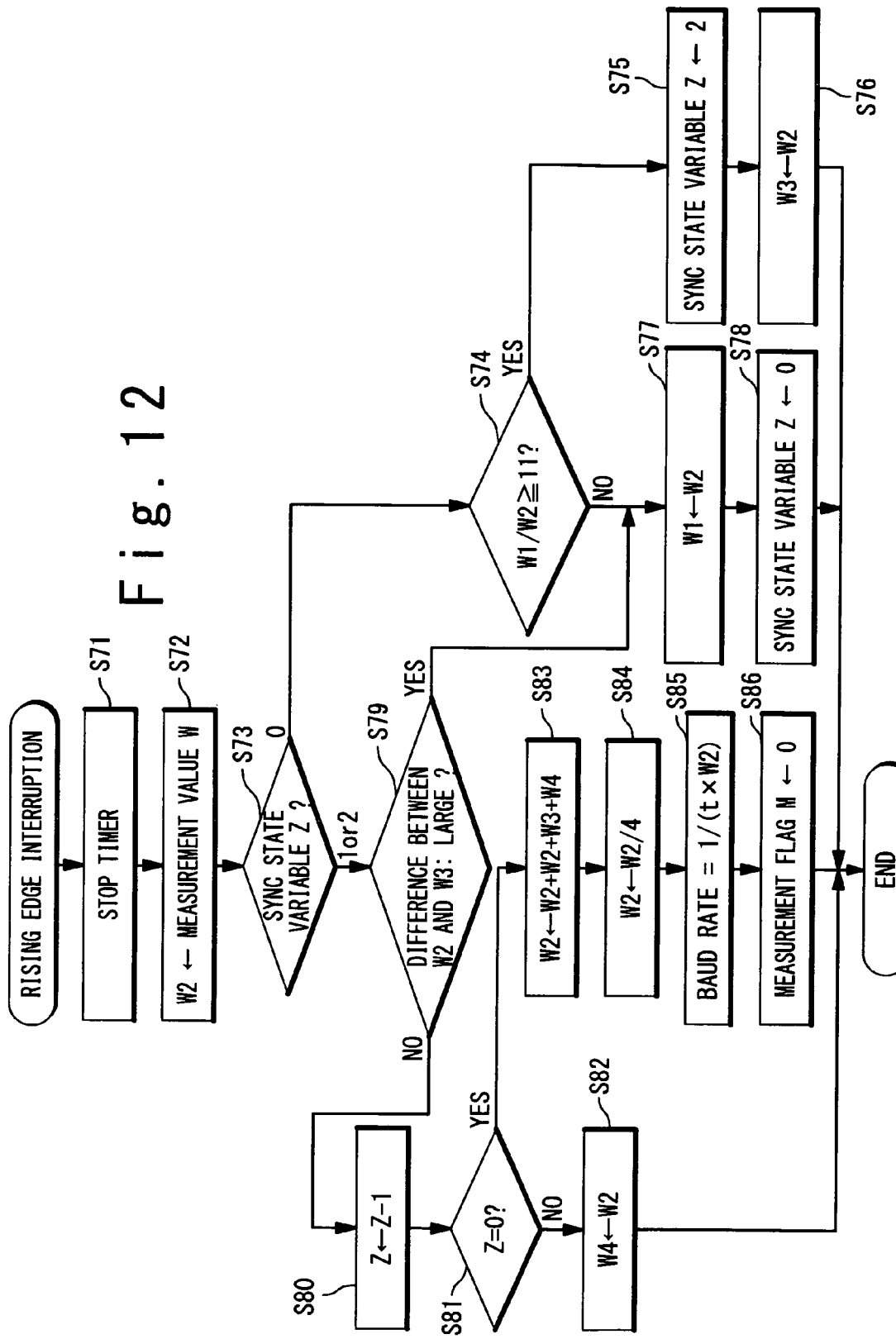
FIG. 12 is a flowchart showing an operation for a rising edge interrupting process in the data receiving unit according to the second embodiment of the present invention.

FIG. 12 is a flowchart showing an operation of a rising edge interrupting process in the data receiving unit (i.e. slave unit 100) according to the second embodiment of the present invention. Referring to FIG. 12, the interrupting process at the rising edge of the binary signal S will be described. In the same manner as the falling edge interrupting process, the slave unit 100 starts an interrupting process when the signal detecting section 110 detects the rising edge of the binary signal S (e.g. B in FIG. 3) in a state of permission of the edge interruption at the step S45 shown in FIG. 7. The signal detecting section 110 supplies the data indicating an edge changed from the low level to the high level in the binary signal S to the timer 120. The timer 120 stops the measurement on the basis of the data indicating the edge changed from the low level to the high level. The timer 120 supplies the measured value W to the storage section 130 (step S71). The step S71 corresponds to the steps B04 to B06 in FIG. 11A.

The storage section 130 stores the measured value W of the variable W2 (step S72). The storage section 130 supplies the variable W1 and the variable W2 to the first comparing section 140. The control section 160 determines whether the synchronization state variable Z indicates 0 or 1 or 2 (step S73).

If the synchronization state variable Z is determined to indicate 0 at the step S73, the first comparing section 140 calculates a value by dividing the variable W1 by the variable W2. The first comparing section 140 has a condition of "the measured value W stored in the variable W1 corresponds to Synch Break and the measured value W stored in the variable W2 corresponds to Synch Field". The first comparing section 140 has a calculation equation of "variable W1/variable W2" and a determination criterion of "being equal to or less than 11", in order to determine whether the condition is met. The first comparing section 140 determines whether or not a calculation resultant value satisfies the determination criterion (step S74). The step S74 corresponds to the step B07-1 in FIG. 11A.

If the calculation resultant value is equal to or more than 11 at the step S74, the control section 160 sets the synchronization state variable Z to 2 (step S75). At this time, it is indicated that the control section 160 has acquired the data satisfying the condition of "the measured value W of the variable W1 corresponds to Synch Break and the measured value W of the variable W2 corresponds to Synch Field".

The storage section 130 deletes a value of the variable W3 and stores a value of the variable W2 in the variable W3 (step S76). Thereafter, the slave unit 100 ends the rising edge interrupting process, followed by being brought into the state of permission of the edge interruption at the step S45 shown in FIG. 7 in order to detect a pulse for decision about Synch Field.

If the calculation resultant value is less than 11 at the step S74, the storage section 130 deletes a value of the variable W1 and stores a value of the variable W2 in the variable W1 (step S77). It should be noted that when the process flow starts by passing through the step S74 initially, the process flow advances to the step S77 because the variable W1 is 0.

The control section 160 sets the synchronization state variable Z to 0 (step S78). More specifically, it means that a pulse which can be regarded as Synch Break or Synch Field has not yet detected. Thereafter, the slave unit 100 ends the rising edge interrupting process, followed by being brought into the state of permission of the edge interruption at the step S45 shown in FIG. 7.

If the control section 160 determines the synchronization state variable Z indicates 2 at the step S73, the storage section 130 supplies the variable W2 and the variable W3 to the second comparing section 150. Moreover, when the control section 160 determines that the synchronization state variable Z indicates 1 at the step S73, the storage section 130 supplies the variable W2 and the variable W3 to the third comparing section 155. The synchronization state variable indicates 1 or 2 at this time, which means that the control section 160 acquires the data satisfying the condition of "the measured value W of the variable W1 corresponds to Synch Break and the measured value W of the variable W3 corresponds to Synch Field". Each of the second comparing section 150 and the third comparing section 155 compares an error between the variable W2 and the variable W3. The second comparing section 150 and the third comparing section 155 have a condition of "both the measured value W of the variable W2 and the variable W3 correspond to Synch Field". Here, the second comparing section 150 and the third comparing section 155 have a calculation equation to acquire an error as "variable W3−variable W2", and a determination criterion of "being within one twentieth of a period of time required to transfer one bit in Synch Filed". The second comparing section 150 and the third comparing section 155 determine whether or not an error value satisfies the determination criterion (step S79). The step S79 corresponds to the steps B07-2 and B07-3 in FIG. 11A. It should be noted that the first comparing section 140, the second comparing section 150 and the third comparing section 155 may be configured in the same functional section when the slave unit 100 performs an operation using the program and the CPU according to the second embodiment.

If an error value is too large to satisfy the determination criterion at the step S79, the process flow advances to the step S77. The control section 160 regards the variable W2 or the variable W3 as an abnormal pulse resulting from external noise or other causes.

If an error value based on the calculations in the second comparing section 150 and the third comparing section 155 is small and satisfies the determination criterion at the step S79, it means that the control section 160 has acquired the data satisfying the condition of "both the measured value W stored in the variable W2 and the measured value W stored in the variable W3 correspond to Synch Field". At this time, the control section 160 subtracts 1 from a value of the synchronization state variable Z (step S80).

The control section 160 determines whether or not a value of the synchronization state variable Z is 0 (step S81).

If the value of the synchronization state variable Z is not 0 at the step S81, the storage section 130 deletes a value of the variable W4 and stores a value of the variable W2 in the variable W4 (step S82). This indicates that up to two pulse widths regarded as Synch Field (i.e. the variable W3 and the variable W4) can be detected. The slave unit 100 ends the rising edge interrupting process, followed by being brought into the state of permission of the edge interruption at the step S45 shown in FIG. 7, in order to obtain a third pulse width corresponding to Synch Field.

When the synchronization state variable Z is 0 at the step S81, the storage section 130 supplies values of the variable W2, the variable W3 and the variable W4 to the mean value calculating section 156. Here, the fact that a value of the synchronization state variable Z is 0 means that the measured value W of the variable W3 regarded as a start bit of Synch Field is determined to be a start bit of Synch Field by the control section 160 because of a small error observed between the measured values W of the variable W2 and the variable W4. The mean value calculating section 156 calculates a value by adding the variable W2, the variable W2, the variable W3 and the variable W4, and uses the calculation resultant value as the variable W2 (step S83). The reason why the variable W2 is added twice is because calculation to obtain a mean value at subsequent step is made easier. The steps S81 to S83 correspond to the steps B08 to B09 in FIG. 11B.

The mean value calculating section 156 calculates a value by dividing the variable W2 by four and supplies an acquired mean value to the storage section 130. The storage section 130 stores a mean value in the variable W2. The mean value calculating section 156 supplies a mean value to the baud rate calculating section 170 (step S84).

The baud rate calculating section 170 acquires a mean value (i.e. variable W2) of the measured value W determined as a start bit of Synch Field. Then, the board rate is calculated by 1/(mean value (variable W2)×resolution t) (1/second). The baud rate calculating section 170 supplies a calculated baud rate for the receiving section 180 (step S85). The step S85 corresponds to the steps B10 to B11 in FIG. 11B.

The receiving section 180 receives data on the binary signal from the master unit 200 on the basis of the acquired baud rate. This operation corresponds to the step B12 in FIG. 11B.

The signal detecting section 110 sets the measurement flag M to 0 and ends the rising edge interrupting process (step S86). The slave unit 100 will then move onto the step S46 shown in FIG. 7.

The slave unit 100 according to the second embodiment of the present invention can detect Synch Field more accurately.

It is because a pulse of a second pulse width is determined as Synch Field through verification of an error among the second pulse width, the third pulse width and a fourth pulse width, and Synch Field is determined on the basis of many pulse comparisons. Furthermore, the baud rate is calculated on the basis of a mean value of pulse widths, exhibiting an effect of reducing a measurement error.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A data receiving apparatus, comprising:
a measuring section configured to measure a first pulse width of a first pulse, a second pulse width of a second pulse, and a third pulse width of a third pulse, during each of the first pulse, the second pulse, and the third pulse, a first signal level of a reception signal is continuous, wherein the first pulse, the second pulse, and the third pulse are sequentially and continuously received by putting a portion of a second signal level different from the first signal level between the first and second pulse and the second and third pulse;
a first comparing section configured to perform a first determination based on a measured value of the first pulse width and a measured value of the second pulse width, wherein the first determination is that the first pulse indicates a start of the reception signal and the second pulse indicates a synchronization signal;
a second comparing section configured to perform a second determination based on the measured value of the second pulse width and a measured value of the third pulse width, wherein the second determination is that the second pulse and the third pulse indicate the synchronization signal;
a control section configured to determine the second pulse as a head of the synchronization signal, based on the first determination of said first comparing section and the second determination of said second comparing section;
a third comparing section; and
a mean calculating section,
wherein said third measuring section measures a fourth pulse width of a fourth pulse having the first signal level which is continued from the third pulse by interposing a portion of the second signal level,
wherein said third comparing section determines that the second pulse and the fourth pulse are the synchronization signal, based on the measured value of the second pulse width and a measured value of the fourth pulse width, and
wherein said mean calculating section calculates a mean value of the second pulse width, the third pulse width and the fourth pulse width.

2. The data receiving apparatus according to claim 1, wherein said first comparing section performs the first determination based on a ratio of the measured value of said first pulse width and the measured value of said second pulse width.

3. The data receiving apparatus according to claim 2, wherein the first determination comprises determining that a ratio of the measured value of the third pulse width to the measured value of the second pulse width is equal to or more than 11.

4. The data receiving apparatus according to claim 1, wherein said second comparing section performs the second determination based on a difference between the measured value of said second pulse width and the measured value of the third pulse width.

5. The data receiving apparatus according to claim 1, further comprising a baud rate calculation section configured to calculate a baud rate based on the second pulse width.

6. The data receiving apparatus according to claim 1, further comprising a baud rate calculating section configured to calculate a baud rate based on the mean value.

7. A data receiving method, comprising:
measuring a first pulse width of a first pulse, a second pulse width of a second pulse, and a third pulse width of a third pulse, during each of the first pulse, the second pulse, and the third pulse, a first signal level of a reception signal being continuous, wherein the first pulse, the second pulse, and the third pulse are sequentially and continuously received by putting a portion of a second signal level different from the first signal level between the first and second pulses and the second and third pulses;
performing a first determination that the first pulse indicates a start of the reception signal and the second pulse indicates a synchronization signal, based on a measured value of the first pulse width and a measured value of the second pulse width;
performing a second determination that the second pulse and the third pulse indicate the synchronization signal, based on the measured value of the second pulse width and a measured value of the third pulse width;
determining the second pulse as a head of the synchronization signal, based on the first and second determinations; and
measuring a fourth pulse width of a fourth pulse having the first signal level which is continued from the third pulse by interposing a portion of the second signal level,
wherein said data receiving method further comprises:
determining that the second pulse and the fourth pulse are the synchronization signal, based on the measured value of the second pulse width and a measured value of the fourth pulse width; and
calculating a mean value of the second pulse width, the third pulse width and the fourth pulse width.

8. The data receiving method according to claim 7, wherein said performing a first determination comprises performing the first determination based on a ratio of the measured value of the first pulse width and the measured value of the second pulse width.

9. The data receiving method according to claim 7, wherein said performing a second determination comprises performing the second determination based on an error between the measured value of the second pulse width and the measured value of the third pulse width.

10. The data receiving method according to claim 7, further comprising calculating a baud rate based on the second pulse width.

11. The data receiving method according to claim 7, further comprising calculating a baud rate based on the mean value.

12. A tangible, non-transitory computer-readable storage medium in which a computer-executable program code is stored for a data receiving method, said method comprising:
measuring a first pulse width of a first pulse, a second pulse width of a second pulse, and a third pulse width of a third pulse, during each of the first pulse, the second pulse, and the third pulse, a first signal level of a reception signal being continuous, wherein the first pulse, the second pulse, and the third pulse are sequentially and continuously received by putting a portion of a second signal level different from the first signal level between the first and second pulses and the second and third pulses;

performing a first determination that the first pulse indicates a start of the reception signal and the second pulse indicates a synchronization signal, based on a measured value of the first pulse width and a measured value of the second pulse width;

performing a second determination that the second pulse and the third pulse indicate the synchronization signal, based on the measured value of the second pulse width and a measured value of the third pulse width; and determining the second pulse as a head of the synchronization signal, based on the first and second determinations wherein said measuring comprises measuring a fourth pulse width of a fourth pulse having the first signal level which is continued from the third pulse by interposing a portion of the second signal level, wherein said data receiving method further comprises:
determining that the second pulse and the fourth pulse are the synchronization signal, based on the measured value of the second pulse width and a measured value of the fourth pulse width; and calculating a mean value of the second pulse width, the third pulse width and the fourth pulse width.

13. The tangible, non-transitory computer-readable storage medium according to claim 12, wherein said performing a first determination comprises performing the first determination based on a ratio of the measured value of the first pulse width and the measured value of the second pulse width.

14. The tangible, non-transitory computer-readable storage medium according to claim 12, wherein said performing a second determination comprises performing the second determination based on an error between the measured value of the second pulse width and the measured value of the third pulse width.

15. The tangible, non-transitory computer-readable storage medium according to claim 12, further comprising calculating a baud rate based on the second pulse width.

16. The tangible, non-transitory computer-readable storage medium according to claim 12, further comprising calculating a baud rate based on the mean value.

17. A data receiving apparatus, comprising:
a measuring section configured to measure a first pulse width of a first pulse, a second pulse width of a second pulse, and a third pulse width of a third pulse, during each of the first pulse, the second pulse, and the third pulse, a first signal level of a reception signal is continuous, wherein the first pulse, the second pulse, and the third pulse are sequentially and continuously received by putting a portion of a second signal level different from the first signal level between the first and second pulse and the second and third pulse;

a first comparing section configured to perform a first determination based on a measured value of the first pulse width and a measured value of the second pulse width, wherein the first determination is that the first pulse indicates a start of the reception signal and the second pulse indicates a synchronization signal;

a second comparing section configured to perform a second determination based on the measured value of the second pulse width and a measured value of the third pulse width, wherein the second determination is that the second pulse and the third pulse indicate the synchronization signal;

a control section configured to determine the second pulse as a head of the synchronization signal, based on the first determination of said first comparing section and the second determination of said second comparing section, wherein said first comparing section performs the first determination based on a ratio of the measured value of said first pulse width and the measured value of said second pulse width wherein the first determination comprises determining that a ratio of the measured value of the third pulse width to the measured value of the second pulse width is equal to or more than 11, wherein said second comparing section performs the second determination based on a difference between the measured value of said second pulse width and the measured value of the third pulse width, and wherein said difference between the measured value of said second pulse width and the measured value of the third pulse width is within one twentieth of a period of time required to transfer one bit in a synch field.

* * * * *